United States Patent
Wheelock

(10) Patent No.: US 11,962,563 B2
(45) Date of Patent: Apr. 16, 2024

(54) ENABLING LOW LATENCY TRAFFIC HANDLING WITHIN IPV6 MAP-T ENVIRONMENT USING NAT

(71) Applicant: ARRIS Enterprises LLC, Suwanee, GA (US)

(72) Inventor: Ian G. Wheelock, Cork (IE)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 17/679,467

(22) Filed: Feb. 24, 2022

(65) Prior Publication Data

US 2022/0345439 A1    Oct. 27, 2022

Related U.S. Application Data

(60) Provisional application No. 63/178,274, filed on Apr. 22, 2021.

(51) Int. Cl.
| | |
|---|---|
| *H04L 61/2557* | (2022.01) |
| *H04L 43/0894* | (2022.01) |
| *H04L 61/251* | (2022.01) |
| *H04L 61/5014* | (2022.01) |
| *H04L 69/167* | (2022.01) |

(52) U.S. Cl.
CPC ...... *H04L 61/2557* (2013.01); *H04L 43/0894* (2013.01); *H04L 61/251* (2013.01); *H04L 61/5014* (2022.05); *H04L 69/167* (2013.01)

(58) Field of Classification Search
CPC ............. H04L 61/2557; H04L 61/5014; H04L 43/0894; H04L 61/251; H04L 69/167
See application file for complete search history.

(56) References Cited

U.S. PATENT DOCUMENTS

| | | | |
|---|---|---|---|
| 7,423,975 B2 * | 9/2008 | Johnson | H04L 12/2801 370/252 |
| 10,693,836 B2 * | 6/2020 | Lim | H04L 63/0245 |

(Continued)

FOREIGN PATENT DOCUMENTS

| | | |
|---|---|---|
| CN | 101771733 | 11/2013 |
| EP | 2 750 437 | 7/2014 |

(Continued)

OTHER PUBLICATIONS

ETSI "Access, Terminals, Transmission and Multiplexing (ATTM); Integrated Broadband Cable and Television Networks; Cable Network Transition to Ipv6"—(Year: 2012).*

(Continued)

*Primary Examiner* — Younes Naji
(74) *Attorney, Agent, or Firm* — Wenderoth, Lind & Ponack, L.L.P.

(57) ABSTRACT

A MAP-T system that shares an IPv4 address with one or more other MAP-T systems identifies low latency (LL) traffic for an upstream and a downstream perspective by enhancing NAT of ports using MAP-T rules. The MAP-T rules provide a range of transport ports with a transport slice providing for a subdivision of the transports into a subnet range so as to isolate certain ports for mapping LL traffic. An access point device and a cable modem of the MAP-T system are configured so as to appropriately transform any received traffic so as to properly direct the traffic.

20 Claims, 13 Drawing Sheets

(56) References Cited

U.S. PATENT DOCUMENTS

| | | | | |
|---|---|---|---|---|
| 10,855,651 | B2* | 12/2020 | Bao | H04L 61/4511 |
| 11,611,639 | B2* | 3/2023 | Carter | H04L 45/741 |
| 2016/0014071 | A1* | 1/2016 | Asati | H04L 61/251 |
| | | | | 709/245 |

FOREIGN PATENT DOCUMENTS

| | | |
|---|---|---|
| WO | 00/60826 | 10/2000 |
| WO | 2021/154515 | 8/2021 |

OTHER PUBLICATIONS

Greg et al. DOCSIS Research and Development "Low latency DOCSIS: Technology Overview"—CableLabs (Year: 2019).*

Mrugalski et al. IETF RFC 7298 "DHCPv6 options of configuration of softwire address and port mapped clients" (Year: 2015).*

Pkt et al. PacketCable Specification Multimedia Specification PKT-SP-MM—106-110629 (Year: 2011).*

Cisco Release Note for Cisco uBR905 and Cisco uBR925 Cable Access Routers for Cisco IOS Release 12.2 CZ—Cisco IOS Release 12.2 (15)CZ3 (Year: 2005).*

Li et al. "Mapping of Address and Port using Translation (MAP-T)"—(RFC7599) (Year: 2015).*

Cordeiro et al. "Experience with Testing of Mapping of Address and Port Using Translation (MAP-T)"—(RFC7703) (Year: 2015).*

International Search Report and the Written Opinion of the International Searching Authority dated May 25, 2022 in International (PCT) Application No. PCT/US2022/017637.

"Access, Terminals, Transmission, 1-20 Multiplexing (ATTM); Integrated Broadband Cable and Television Networks; Cable Network Transition to IPV6", ETSI Draft; AT3018V0013, European Telecommunications Standards Institute (ETSI), 650, Route Des Lucioles; F-06921 Sophia Antipolis; France, No. V0.0.13, Aug. 29, 2012 (Aug. 29, 2012) pp. 1-153, XP014070905.

Mawatari Japan Internet Exchange M Kawashima Nec Accesstechnica M et al: "464XLAT: Combination of Stateful and Stateless Translation; rfc6877.txt", 464XLAT: Combination of Stateful and Stateless Translation; RFC6877.Txt, Internet Engineering Task Force, IETF; Standard, Internet Society (ISOC) 4, Rue Des Falaises CH-1205 Geneva, Switzerland, Apr. 3, 2013 (Apr. 3, 2013), pp. 1-14, XP015090335.

Troan Cisco S Matsushima Softbank Telecom T Murakami IP Infusion X Li C Bao Cernet Center/Tsinghua O: "Mapping of Address and Port (MAP); draft-rndt-softwire-rnapping-address-and-port-03.txt", Mapping of Address and Port (MAP) ; Draft-MDT-Softwire-Mapping-Address-and-Por T-03.Txt, Internet Engineering Task Force, IETF; Standardworkingdraft, Internet Society (ISOC) 4, Rue Des Falaises CH-1205 Geneva, Switzerland, Jan. 30, 2012 (Jan. 30, 2012), pp. 1-19, XP015080432.

Cheng Huawei Technologies D: "NAT44 with Pre-allocated Ports; draft-cheng-behave-nat44-pre allocated-ports-02 . txt", NAT44 With Pre-Allocated Ports; Draft-Cheng-Behave-NAT44-Pre Allocated-Ports-02.Txt, Internet Engineering Task Force, IETF; Standardworkingdraft, Internet Society (ISOC) 4, Rue Des Falaises CH-1205 Geneva, Switzerland, No. 2, Mar. 11, 2011 (Mar. 11, 2011), pp. 1-12, XP015074582.

International Preliminary Report on Patentability dated Oct. 24, 2023 in International (PCT) Application No. PCT/US2022/017637.

* cited by examiner

IPv4 NAT LLD example

| Start Port | Start LLD Resv | End LLD Resv | End Port |
|---|---|---|---|
| 0 | 3000 | 4000 | 65535 |

DOCSIS CM CFG file
(One rule required per CM)

US LLD SF#1
DS LLD SF#2

US Classifier.ref= SF#1
US Classifier.SrcPortStart= 3000
US Classifier.SrcPortEnd= 4000

DS Classifier.ref= SF#2
DS Classifier.DstPortStart= 3000
DS Classifier.DstPortEnv= 4000

MAP-T NAT LLD example

| CP # | Start of Slice | Start LLD Resv | End LLD Resv | End of Slice |
|---|---|---|---|---|
| 0 | 0 | | | 16383 |
| 1 | 16384 | 19384 | 20384 | 32767 |
| 2 | 32768 | 35768 | 36768 | 49151 |
| 3 | 49152 | 52152 | 53152 | 65535 |

DOCSIS CM CFG file
(One rule required per CM)

US LLD SF#1
DS LLD SF#2

US Classifier.ref= SF#1
US Classifier.SrcPortStart= 19384
US Classifier.SrcPortEnd= 20384

US Classifier.SrcPortStart= 35768
US Classifier.SrcPortEnd= 36768

US Classifier.SrcPortStart= 52152
US Classifier.SrcPortEnd= 53152

DS Classifier.ref= SF#2
DS Classifier.DstPortStart= 19384
DS Classifier.DstPortEnd= 20384

DS Classifier.DstPortStart= 35768
DS Classifier.DstPortEnd= 36768

DS Classifier.DstPortStart= 52152
DS Classifier.DstPortEnd= 53152

ENABLING LOW LATENCY TRAFFIC HANDLING WITHIN IPV6 MAP-T ENVIRONMENT USING NAT

FIELD

The present disclosure relates generally to network address translation (NAT) port remapping using a DOCSIS cable modem configuration file or DSX exchange so as to operate within a mapping of address and port using translation (MAP-T) environment where a plurality of network devices share the same Internet protocol version 4 (IPv4) addresses.

BACKGROUND

Cable service providers, which are also referred to as Multiple System Operators (MSO), typically transmit analog and digital video broadcast television signals, as well as broadband data services, to their customers. These broadband data services typically include Internet access using the Data Over Cable Service Interface Specification (DOCSIS) protocol. To provide television and data Services, a MSO typically uses a Cable Modem Termination System (CMTS) for the data services and a quadrature amplitude modulation (QAM) multiplexer for downstream broadcast television, narrow cast and video on demand (VoD) traffic signals. These devices may be located at one or more hubs, which are typically connected to the head end via a network according to a networking protocol, such as, for example, Ethernet or SONET, as known in the art. These devices typically have multiple outputs for downstream signals, as well as multiple inputs for upstream signals, that are sent to or received at consumer households, bars, and other commercial establishments.

Currently NAT is used to cope with IPv4 address exhaustion as well as minimizing the number of exposed IP (Internet Protocol) addresses that may be present within a network. In the case of Internet Service Providers (SPs), broadband gateways assign local IP addresses from a pre-configured IP subnet for local devices. The assigned IP addresses are different to the external Wide Area Network (WAN) IP address the ISP uses for the broadband gateway itself, which is typically provided using the ISP Dynamic Host Configuration Protocol (DHCP) system. Traffic from local devices going to the internet are transformed using Network Address Port Translation (NAPT or NAT for short), whereby their assigned IP addresses are replaced by the gateway WAN IP address, and the source Transmission Control Protocol (TCP) or User Datagram Protocol (UDP) port numbers are replaced with available allocations from the NAT function. For a Source (SRC), the NAT function retains this SRC_IP+SRC_port to WAN_IP+NEW SRC_port mapping, and when the broadband gateway receives traffic sent to WAN_IP+NEW_SRC_port, it is able to replace it with the recorded NAT mapping, and relays the traffic to the local device.

The use of NAT typically means that the IP address of local devices are "obfuscated," and are extremely difficult to resolve without the NAT mapping information. As a result, when Broadband Network Gateways (BNG) or DOCSIS cable modem termination system (CMTS) devices that connect broadband gateways to the Internet, all they see are the so-called WAN IP addresses of the gateways—effectively only being able to provide quality of service (QoS) to the gateway itself, and not the individual devices behind it. In one or more aspects of the present disclosure, a method for enabling a plurality of devices and the services running on these devices to receive QoS through a combination of the NAT/MAP-T processing and the identification of these services through packet identification within a client-side network, for example, a home environment.

Operators, such as MSOs, are increasingly seeking to migrate core networks to operate with Internet protocol version 6 (IPv6) but must take into consideration that IPv4 is still the dominant Intern and home networking technology in use. Thus, there is a need to enable IPv6 transport through the MSO network while allowing the multiplexing of multiple gateways to use the same IPv4 address.

SUMMARY

As described herein is a system and a method for transmitting packets between one or more client devices of a IPv4 client-side network and an IPv4 Internet-side network.

An aspect of the present disclosure provides a method for transforming by a mapping of address and port using translation (MAP-T) system one or more Internet Protocol version 4 (IPv4) packets for transmission on a low latency service flow. The method comprises receiving, at an access point device (APD) of the MAP-T system, the one or more IPv4 packets from at least one client device of one or more client devices, wherein the APD is connected to the one or more client devices, and wherein the APD is assigned an IPv4 address that is shared by a plurality of MAP-T systems, transforming, by the APD, the one or more IPv4 packets to one or more Internet Protocol version 6 (IPv6) packets based on a MAP-T configuration, wherein transforming the one or more IPv4 packets to one or more IPv6 packets comprises mapping the one or more IPv4 packets to a port within a range of ports of a transport slice assigned to the APD, sending, by the APD by using the NAT stage of MAP-T, the one or more IPv6 packets to a cable modem (CM) of the MAP-T system, classifying, by the CM, the one or more IPv6 packets to a low latency service flow based on a classifier, and transmitting, by the CM, the one or more IPv6 packets on the low latency service flow to a border router for remapping of the one or more IPv6 packets back to the one or more IPv4 packets for sending to an IPv4 Internet-side network.

In an aspect of the present disclosure, the method further comprises receiving, at the APD, the MAP-T configuration, wherein the MAP-T configuration comprises one or more DHCPv6 configuration options.

In an aspect of the present disclosure, the method is such that the one or more DHCPv6 configuration options comprises a prefix and an active IP address associated with the border router.

In an aspect of the present disclosure, the method further comprises configuring the CM using a Data Over Cable Service Interface Specification (DOCSIS) CM configuration file, wherein the DOCSIS CM configuration file comprises an one or more classifiers, wherein the classifier is one of the one or more classifiers.

In an aspect of the present disclosure, the method further comprises creating, by the APD, a destination address for the one or more IPv4 packets, wherein the destination address is copied into the last 32-bits of the IPv6 address of the one or more IPv6 packets.

In an aspect of the present disclosure, the method is such that the DOCSIS classifier comprises a start transport port identifier and an end transport port identifier that define the range of ports related to low latency traffic.

In an aspect of the present disclosure, the method further comprises configuring the CM using a Data Over Cable Service Interface Specification (DOCSIS) dynamic service (DSX) transaction, wherein the DOCSIS DSX transaction comprises one or more classifiers.

An aspect of the present disclosure comprises a MAP-T system for transforming one or more IPv4 packets for transmission on a low latency service flow. The MAP-T system comprises a memory storing one or more computer-readable instructions and a process connected to the memory. The processor is configured to execute the one or more computer-readable instructions to perform any one or more of the steps discussed herein.

An aspect of the present disclosures provides a non-transitory computer-readable medium of a MAP-T system storing one or more instructions for transforming one or more Internet Protocol version 4 (IPv4) packets for transmission on a low latency service flow. The one or more instructions when executed by a processor of the MAP-T system, cause the MAP-T system to perform one or more operations including the steps of the methods described herein.

BRIEF DESCRIPTION OF THE DRAWINGS

FIG. 10A illustrates an example cable modem configuration for NAT/IPv4, according to one or more aspects of the present disclosure;

FIG. 10B illustrates an example MAP-T system for MAP-T NAT LLD, according to one or more aspects of the present disclosure;

DETAILED DESCRIPTION

Figure 1:
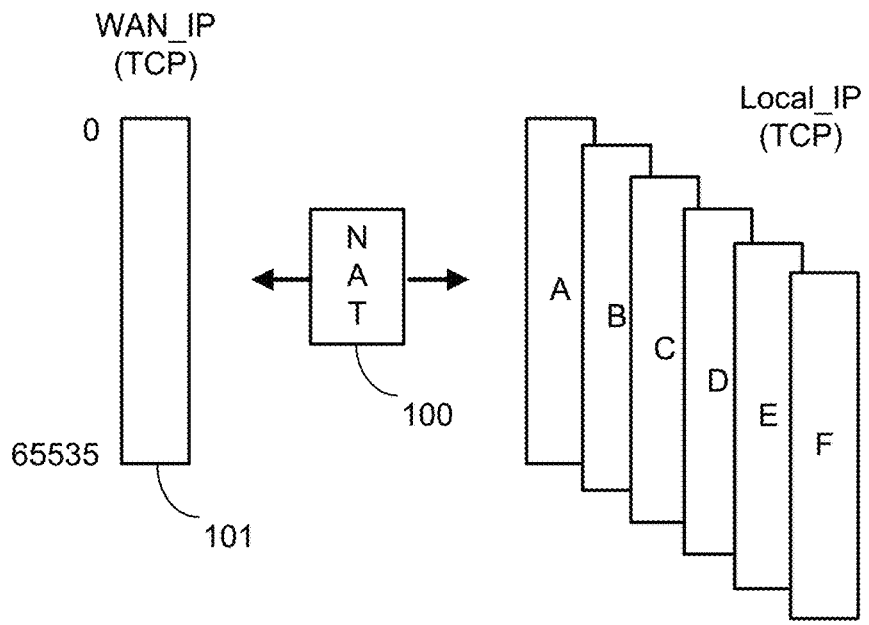
FIG. 1 is an illustration of a normal NAT process for translating the network addresses of a plurality of home network devices A, B, C, D, E, and F having Local_IP addresses, and also illustrated is a WAN_IP address and its associated port numbers.

NAT source port remapping can be used in conjunction with static DOCSIS cable modem configuration classifier rules or dynamically signaled (from the cable modem) classifier rules to support control over traffic that needs low latency handling. Remapping the source ports of selected traffic to a range of ports for US traffic classification allows the same range of ports to be used for DS traffic classification, as they will appear as destination ports in the DS. For NAT source port remapping, the gateway (a gateway and an access point device are used interchangeably herein) includes an Internet address for enabling the gateway to be addressed by the server and the LAN. A plurality of ports on the gateway enables the gateway to receive and transmit data to and from the server and the LAN. A processor divides the ports on the gateway into at least a first range of port numbers and a second range of port numbers. NAT source port remapping works in the native IPv4 environment with a range, R, of source transport ports being reserved from the entire available set of transport ports (0-65535). Traffic identified as suitable for a higher level of QoS, for example, traffic identified as requiring low latency, is assigned to the first range of port numbers (the low latency traffic is NAT'd to the R range of ports), and classified traffic identified as suitable for a lower level of QoS is assigned to the second range of port numbers (the non-low latency traffic is kept out of the R range of ports). The gateway is responsible (via the NAT process) for assigning ports to one or more selected services running on devices on the LAN with a level of QoS depending upon the port numbers assigned to one or more associated services. The ports on the gateway may be divided into a third range of port numbers to provide an additional level of QoS. It should be noted that the number N of ranges of port numbers is not limited to two or three, but can be nearly any number N which is substantially greater than two (e.g., dozens or even hundreds).

All US traffic is sent by the gateway or access point device to the DOCSIS media access control (MAC), where the classification rules (that have been setup either by a DOCSIS cable modem configuration file or by using DOCSIS DSX) are applied to this traffic such that classified traffic is appropriately steered to the DOCSIS service flow associated with the configured classifiers, in this example a low-latency service flow. All other non-matching traffic (non-low latency traffic) is steered to use the DOCSIS classical service flow. The range R of ports are treated as source ports for upstream (US) traffic and destination ports for downstream (DS) traffic. This approach enables both the cable modem (CM) and CMTS to steer low latency traffic without, for example, necessarily having to rely on the use of differentiated services code point (DSCP) classification which may be used in addition to the TCP/UDP port range to classify traffic. By relying on source and destination ports in this way, traffic can be sent out to and back from the Internet without losing any low latency meaning (as the value of the source and destination ports are always retained within the TCP/UDP header), unlike DSCP classification which may be bleached on return from the Internet.

It is understood that native IPv4 operates by assigning a unique WAN IP address to each gateway and relying on each gateway to perform NAT for all of the connected LAN hosts. The NAT process can operate over the entire range of transports ports (ports 0-65535). For MAP-T, operators or MSOs want to migrate the core network to operate with IPv6 but understand that IPv4 is still the dominant Internet and home networking technology in use. One reason to move to IPv6 is the scarcity of IPv4 addresses. The MAP-T approached discussed herein addresses the issues associated with IPv4 by enabling a native IPv6 transport through the operator or MSO network while allowing the multiplexing of a plurality of gateways to use the same IPv4 address.

The MAP-T approach discussed herein relies on using a single IPv4 address between a group of N gateways (where N represents any number of gateways), and then slicing up the available transport port range (0-65535) between the N gateways. For example, in a system that comprises four gateways each of the gateways could be provided with a slice/range, S, of 16384 unique, non-overlapping transport port numbers to use, for example, as discussed with reference to FIG. 5. In an IPv4 network, multiple devices are not allowed to have the same IP address as this would lead to IP address duplication and routing issues. MAP-T address this issue by wrapping up the IPv4 address within a unique IPv6 address that is assigned to each of the group of N gateways. Any traffic sent by a MAP-T gateway is seen as IPv6 traffic to the network (avoiding the duplicate IPv4 situation). This traffic is received by a Border Router (BR), that extracts the IPv4 details from IPv6 and sends the traffic out to the Internet. From the Internet/IPv4 perspective, the BR looks like it hosts all the IPv4 addresses (for example, as a single host), and as each gateway is assigned a non-overlapping unique set of transport ports, there are no IPv4+transport port collisions in traffic leaving the BR. An aspect of this MAP-T approach relates to how the source-port NAT process is applied within the constraints of the configured MAP-T port range assigned to an individual gateway, by using a subset of this port range for special classification/latency purposes. Traffic selected for low latency (that have been identified using an identification system) has source-port NAT processing (using the port subset) applied to it. The resultant traffic can then be classified by the DOCSIS US MAC in the CM to a low latency SF, and similarly can be classified by the DOCSIS DS MAC in the CMTS to a low latency SF. Additional details in this disclosure describe how to configure this port subset for MAP-T gateways to use via DHCPv6 options (that are derived from the static MAP-T Border Router configuration) and the DOCSIS CM configuration file where a single file set of classifiers associated with US and DS can be supplied to the entire population of CMs. Other details describe an alternative system that requires the MAP-T gateway or access point device to choose an appropriate subset of port values from the assigned port range to be used for low latency traffic, with these port subsets used in the dynamic configuration of US and DS classifiers configured between the CM and the CMTS thus removing the need for special static classifiers in the DOCSIS CM configuration file.

In MAP-T, NAT is also used to NAT all the LAN side host traffic to the MAP-T assigned WAN IP address. NAT in this case must ensure that each gateway remaps all LAN source transport ports to the assigned slice/range S of ports provided by MAP-T. The improved NAT method for the treatment of LLD traffic requires the transport slicing to be taken into account. In native IPv4, the range R of ports is taken from the 0-65535 ranges of ports. In MAP-T, for each slice/range S of ports, a subset of ports (Rs) (equivalent to the R range in IPv4) or Rs must be defined for the improved LLD NAT processing. For example, in a system that comprises eight gateways there would be eight separate slices and each slice would require a sub-range Rs of ports from the assigned slice/range S ports to be used for the low latency DOCSIS treatment. That is, the NAT function must remap traffic identified as low latency to use the sub-range Rs for their outbound source transport port. MAP-T uses DHCP version 6 (v6) to signal the specific IPv4 address and details of the range of transport port S to use a gateway or access point device.

In some applications that utilize NAT, the DHCPv6 provisioning is extended to identify the sub-range Rs within the slice/range S within the DHCPv6 messaging. A new field can be created to signal the subnet range and this field can be included in the DHCPv6 signaling. The DOCSIS CM configuration file is relied on to communicate the required low latency traffic classifiers to the CM and/or CMTS. The same classifier rules can be used for every CM which simplifies the configuration overhead of low latency, requiring no dynamic signaling between DOCSIS elements. To achieve the same simplicity for MAP-T, the CM configuration file can be prepared with US source port and DS destination port classifiers configured to match each of the sub-range Rs that can be associated with a single IP address. There is no need to include IP address information. Depending on the number of N gateways using a single MAP-T IP address, there will be at least 2N classifier entries for US low latency service flow and 2N classifier entries for DS low latency service flow. Generally, CMs can support multiple classifiers per service flow. However, there is a limit of how many classifiers can be defined. A DSX transaction approach can be utilized to overcome this limitations on classifiers as discussed with reference to FIG. 12.

The MAP-T approach discussed herein can apply to a single device system (for example, a system that comprises a combined DOCSIS CM combined with a gateway and/or an access point), a two device system (for example, a system that comprises a separate DOCSIS CM connected to a standalone gateway and/or access point), or both. The DOCSIS CM will receive and use the DOCSIS classifiers on any traffic received (either from an integrated gateway or an external gateway function). The DOCSIS CM classifies the received IPv6 traffic using Layer 4 (transport) classifiers. The gateway function performing MAP-T NAT will be configured with the IPv4 WAN IP address and the S range of transport ports and with the Rs range of ports to be used for low latency traffic. After the CM is registered (with the associated CM configuration file) and the MAP-T NAT function is enabled with the S range and Rs range of ports then any low latency identified traffic will be automatically remapped by the gateway or access point device and classified to the low latency service by the connected DOCSIS layer 2 (L2) cable modem.

Providing a MAP-T LLD approach that relies on an IPv4 NAT and pre-configured DOCSIS CM configuration file classifiers requires tight coordination between the transport port slicing required by MAP-T (cable modem and border router) and the setting up of the cable modem configuration file (as discussed with reference to FIG. 11). For example, the classification range must fall within the available transport slices. The NAT element must be updated to provide SrcPort remap for LLD traffic in addition to SrcPort remap for existing MAP-T handling. In this way, the MAP-T configuration discussed herein works with little to no coordination between L2 cable modem and L3 gateway (two-box solution) once the system has been configured/setup, as NAT occurs in layer 3 (L3) gateways or access point devices and the DOCSIS L2 cable modem performs classification based on the cable modem configuration file.

Referring now to FIG. 1, the figure illustrates a normal NAT process 100 for a plurality of devices A, B, C, D, E, and F having Local_IP addresses and a WAN_IP address and its associated port numbers 101. The WAN_IP address is typically associated with port numbers that range from 0 through 65535. The plurality of local devices A, B, C, D, E, and F are each assigned a local_IP address. The WAN_IP address and port numbers 101, as well as the Local_IP addresses for the devices A, B, C, D, E, and F are preferably configured to comply with TCP. Basically, within a home network, NAT works on the basis of mapping all TCP and UDP traffic from local devices, such as A, B, C, D, E, and F to allocated TCP and UDP port numbers attached to the WAN_IP address 101. The allocation of such ports is arbitrary.

Figure 2:
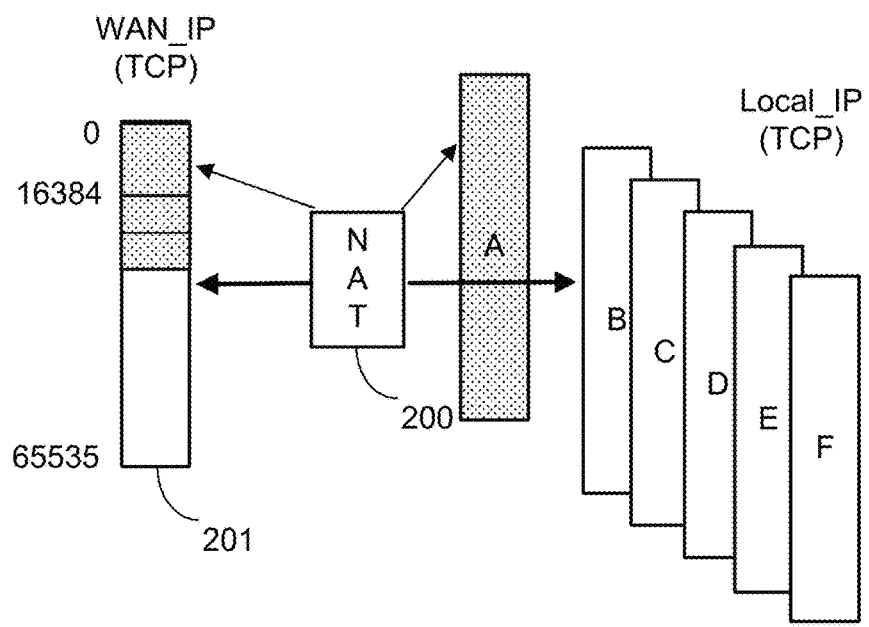
FIG. 2 is an illustration of an improved NAT process for translating the network addresses of a plurality of home network devices A, B, C, D, E, and F having Local_IP addresses, and also illustrated is a WAN_IP address and its associated port numbers.

Referring now to FIG. 2, the figure illustrates an improved NAT process 200 that includes a plurality of devices A, B, C, D, E, and F having Local_IP addresses and a WAN_IP address and its associated port numbers 201. The improved NAT process 200 changes the arbitrary allocation of the normal NAT process 100 so that defined ranges of TCP and UDP ports associated with the WAN_IP address 201 can be used for local high priority purposes, and these defined ranges notified to a BNG/CMTS. From a BNG/CMTS perspective the TCP/UDP port space is partitioned into ranges that can in turn be mapped to explicit QoS allocations. In FIG. 2, the port space is preferably partitioned into at least a first range of 0 to 16,384 and a second range of 16,385 to 65,535. If desired, the second range can be further partitioned.

Figure 3:
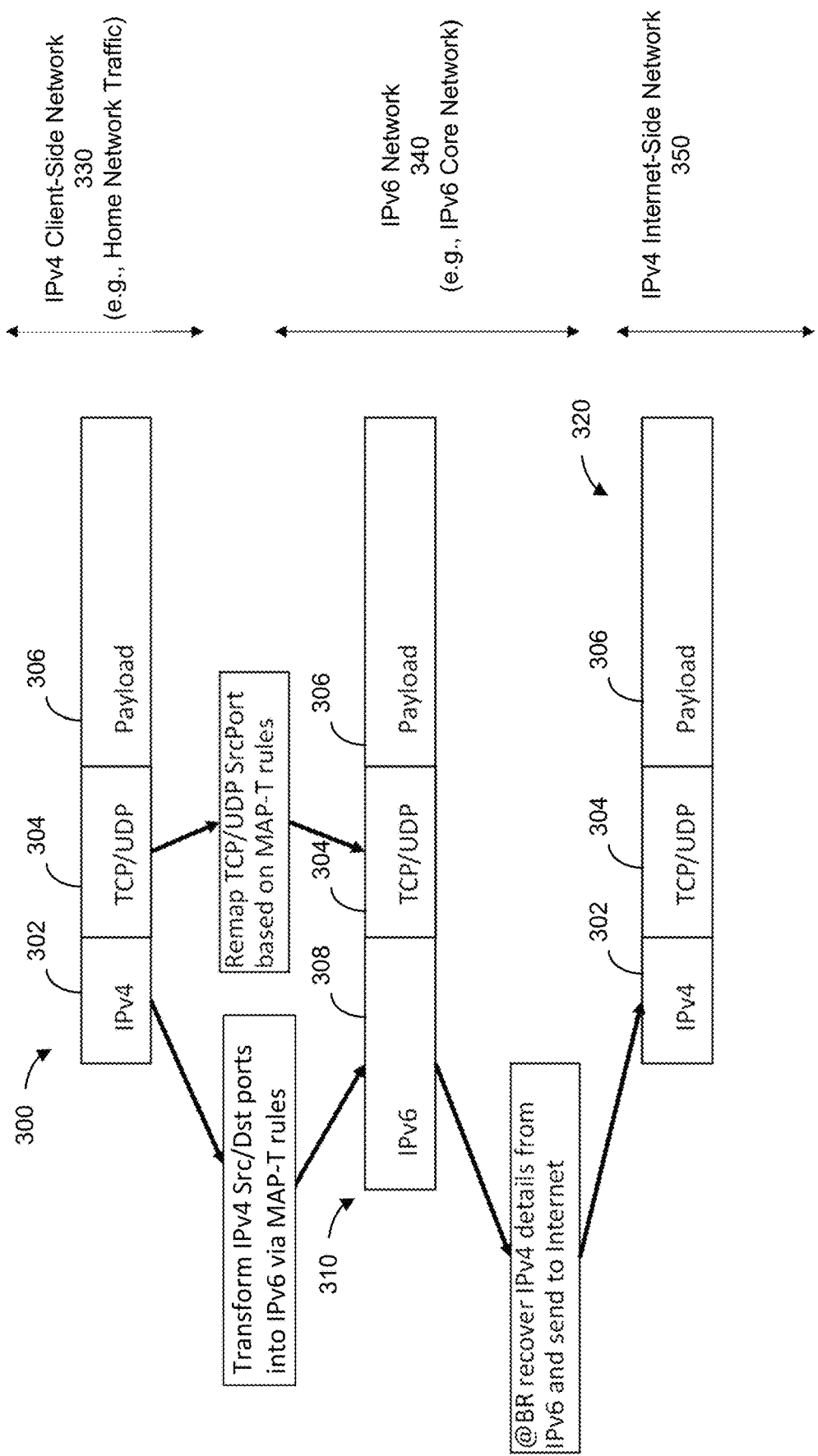
FIG. 3 is an illustration of mapping of an address and port with MAP-T, according to one or more aspects of the present disclosure.

Referring now to FIG. 3, the figure illustrates mapping of an address and port with MAP-T, according to one or more aspects of the present invention. An IPv4 packet 300 generated or created for communication via IPv4 client-side network 330, for example, by a client device within the home network as home network traffic, for transmission via IPv4 Internet-side network 350 via an IPv6 network 340 (for example, an IPv6 core network). The IPv4 packet 300 comprises an IPv4 packet header 302, a TCP/UDP identifier 304, and a payload (for example, data) 306. The IPv4 packet header 302 comprises one or more fields, for example, an IPv4 source port (SrcPort) and an IPv4 destination port (DstPort) that are transformed or mapped to IPv6 addresses based on MAP-T rules. The TCP/UDP identifier 304 identifies the protocol associated with the payload 306. The TCP/UDP identifier 304 can be a field within the IPv4 packet header 302.

The IPv4 packet 300 is transformed or mapped to an IPv6 packet 310 for transmission via the IPv6 network 340. The IPv6 packet 310 comprises an IPv6 packet header 308, the TCP/UDP identifier 304, and the payload 306. The IPv4 SrcPort and IPv4 DstPort of the IPv4 packet header 302 can be transformed or mapped to an IPv6 SrcPort and an IPv6 DstPort of IPv6 packet header 308 for IPv6 packet 310 via MAP-T rules. For example, an IPv4 destination address is mapped to a 128-bit IPv6 destination address using a prefix that has been supplied to the access point device associated with a cable modem (for example, a MAP-T system 440 as discussed with reference to FIG. 4 using DHCPv6). The access point device has the first 96-bits of the 128-bit IPv6 destination address based on the DHCPv6 server information and can copy the 32-bits from the IPv4 destination address into the full 128-bits of the IPv6 destination address. The IPv4 source address is remapped using MAP-T values, that is, the DHCP details provide the required information to identify the IPv4 prefix and the port set the MAP-T gateway or access point device needs to use. The information supplied by the DHCPv6 server to the access point device allows the access point device to create the new IPv4 source address. With the IP header (the IPv6 source address and the IPv6 destination address)) of the IPv6 packet 310 is complete. The TCP/UDP fields 304 are remapped using the Map-T rules from the port set identification information/EA bits that the HDCPv6 server sends to the MAP-T gateway or access point device. The information supplied by the DHCPv6 server to the access point device identifies to the access point device the range of transport ports that are allowed to be utilized when traffic is sent by the access point device and/or cable modem through MAP-T.

IPv6 packet 310 is directed to a border router which converts the IPv6 packet 310 back into an IPv4 packet. The border router takes the IPv6 destination address and recovers the 32-bit IPv4 destination address and uses that as the IPv4 destination address and similarly takes the IPv4 source address from the IPv6 source address. The TCP/UDP fields 304 are not altered by the border router. Once the border router maps the IPv6 header 308 back to the IPv4 header 302 to form the remapped IPv4 packet 320, the border router sends the remapped IPv4 packet 320 to the IPv4 Internet-side network 350.

A similar reverse process occurs when received traffic from the IPv4 Internet-side network 350 for transmission to the IPv4 client-side network 330. For example, an IPv4 packet arrives from the IPv4 Internet-side network 350 at the border router. The border router reinstates the IPv6 headers and sends the newly created IPv6 packet over the IPv6 network 340 to the access point device. The access point device transforms or maps the IPv6 source and destination addresses back to the original IPv4 addresses and then performs the NAT process that recovers the original client device and layer-4 port numbers to direct the packet to the appropriate client device within the IPv4 client-side network 330.

To transmit the IPv6 packet from the IPv6 network 340 to the IPv4 Internet-side network 350, the IPv6 packet 310 is transformed or mapped back to an IPv4 packet 320. At the border router, the IPv4 packet header 302 is recovered from the IPv6 packet header 308 while the TCP/UDP 304 and the payload 306 remain the same. In this way, the IPv4 packet 300 can be communicated from the IPv4 client-side network 330 to the IPv4 Internet-side network 350 using an IPv6 network 340.

Figure 4:
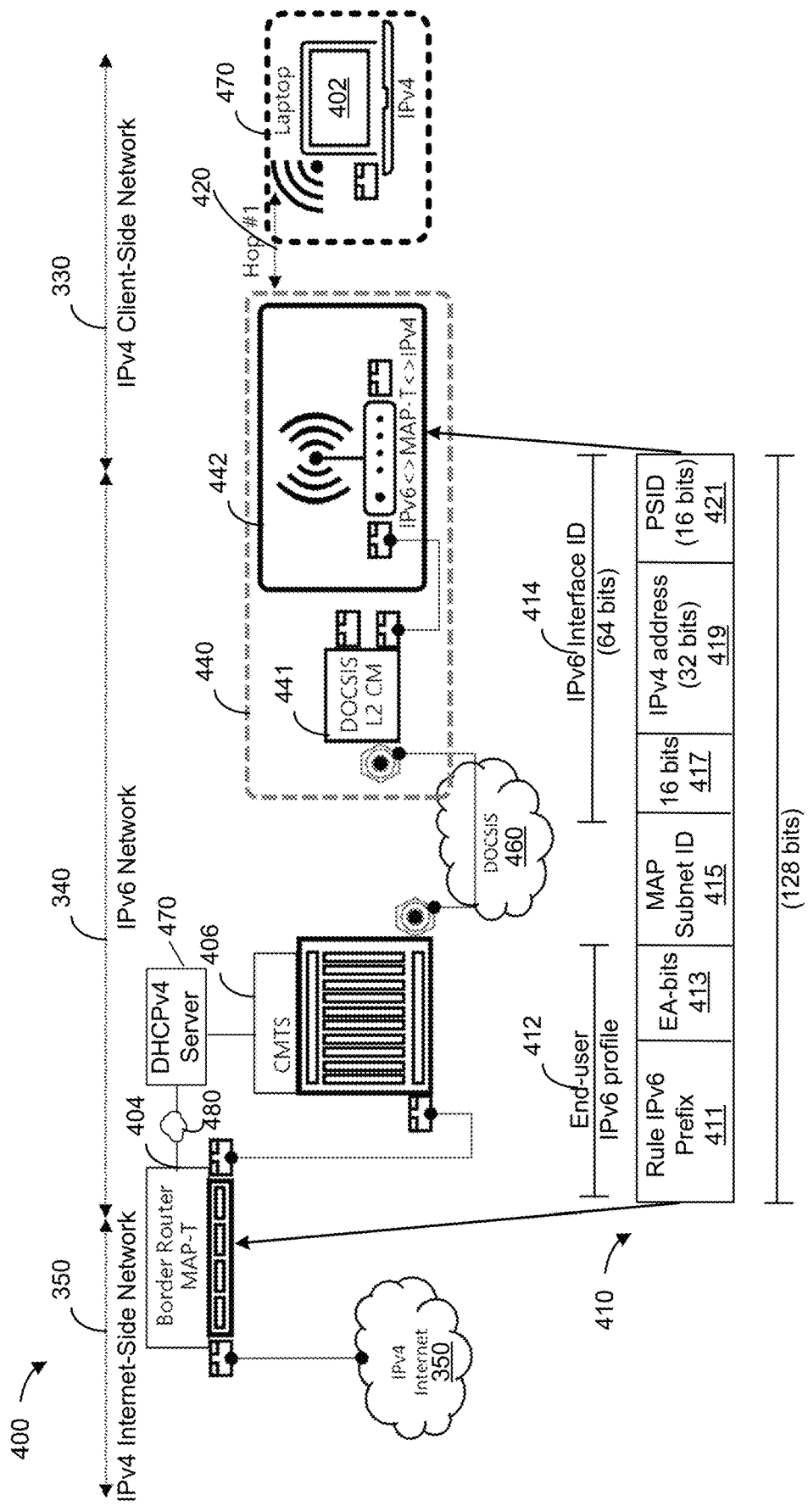
FIG. 4 is a block diagram of a MAP-T configuration, according to one or more aspects of the present disclosure.

FIG. 4 illustrates a block diagram of a MAP-T environment 400, according to one or more aspects of the present disclosure. The MAP-T environment 400 comprises an IPv4 Internet-side network 350, an IPv6 network 340, and an IPv4 client-side network 330. MAP-T provides a service to connect the IPv4 client-side network 330 via the IPv6 network 340 to the IPv4 Internet-side network 350 and MAP-T rules are used to translate the IPv4 traffic on either side of the IPv6 network 350.

The IPv4 Internet-side network 350 comprises a border router MAP-T 404 for transforming or mapping an IPv6 source address 410 to recreate the original IPv4 packet before sending the packet to the IPv4 Internet-side network 330 based on MAP-T rules. The border router 404 exists in the IPv6 network 340 and is provisioned with a Rule IPv6 prefix 411 and an active IP address. When setting up MAP-T, one or more DHCPv6 configuration options, such as the prefix and active IP address, of the border router 404 are used in the DHCPv6 MAP-T configuration that is sent to the MAP-T system 440. The border router 404 can be connected to an IPv4 Internet-side network 350 and to a DHCPv6 network 480. The DHCPv6 network 480 connects the border router 404 with the DHCPv6 server 470 connects to the CMTS 406.

The IPv6 source address 410 comprises an end-user IPv6 profile 412 that comprises rule IPv6 prefix 411 (an IPv6 prefix assigned by a service provider for a mapping rule) and an embedded address (EA) bits 413 in the IPv6 address (identify any whole or part of an IPv4/prefix and/or address or any whole or part of a shared IPv4 address and a port-set identifier), a MAP subnet identification (ID) 415, and an IPv6 interface ID 414 comprising 64 bits (16 bits 417 that are zero filled, an IPv4 address of 32 bits 419, and a port-set ID (PSID) 421 of 16 bits).

The border router (MAP-T) 404 is connected to a CMTS 406. The CMTS 406 is connected to a DOCSIS Internet resource 460. The DOCSIS Internet resource 460 connects to a MAP-T system 440 (such as a customer premises equipment). The MAP-T system 440 can comprise a cable modem 441, such as a DOCSIS layer 2 (L2) cable modem 441, and an access point device 442. The DOCSIS L2 cable modem 441 of the MAP-T system 440 can rely on a DOCSIS cable modem configuration (CFG) file (as discussed with reference to FIG. 10B) that provides IPv4 address and port set information. The DOCSIS cable modem configuration file can provide a classifier that includes the port range information for use with mapping traffic IPv4 traffic and in particular LLD IPv4 traffic received from a client device 470. The IPv4 address and port set information is supplied to the access point device 2 of the MAP-T system 440 via DHCPv6 information. The DOCSIS L2 cable modem 441 and the access point device 442 can be separate devices or included within a single device. The access point device 442 can be, for example, an access point and/or a hardware electronic device that may be a combination modem and gateway that combines the functions of a modem, an access point (AP), and/or a router for providing content received from the Internet to one or more client devices 470 within the network, for example, an IPv4 client-side network 330.

The MAP-T system 440 connects via the DOCSIS layer 2 cable modem 441 to the CMTS 406. The DOCSIS L2 cable modem 441 connects to or is part of the access point device 442 which provides mapping or transformation of one or more IPv4 packets received from a client device 470 to one or more IPv6 packets. The IPv6 MAP-T router 452 can be a dual-band router that connects to the Internet through the DOCSIS layer 2 cable modem 441. A client device 402, such as a laptop, associated with a customer (such as a customer of an Internet Service provider, a user, a network, etc.) is connected to the MAP-T system 440 using an IPv4 addressing. For example, the client 402 can be connected via a connection 420 (for example, a wired and/or wireless connection that is a direct and/or indirect connection, collectively referred to as Hop #1) to the MAP-T system via a connection 420, for example, a Wi-Fi connection and/or an Ethernet connection. The MAP-T system 440 shares a single IPv4 IP address across multiple customers such that the MAP-T system 440 assigns a single IPv4 address to multiple customers while offering each customer a unique range of transport ports (ITCP/UDP) associated with the assigned IPv4 address. The MAP-T system 440 encodes the IPv4 prefix and transport bits selection into the end-user IPv6 prefix 411 to create a unique IPv6 address per customer.

Figure 5:
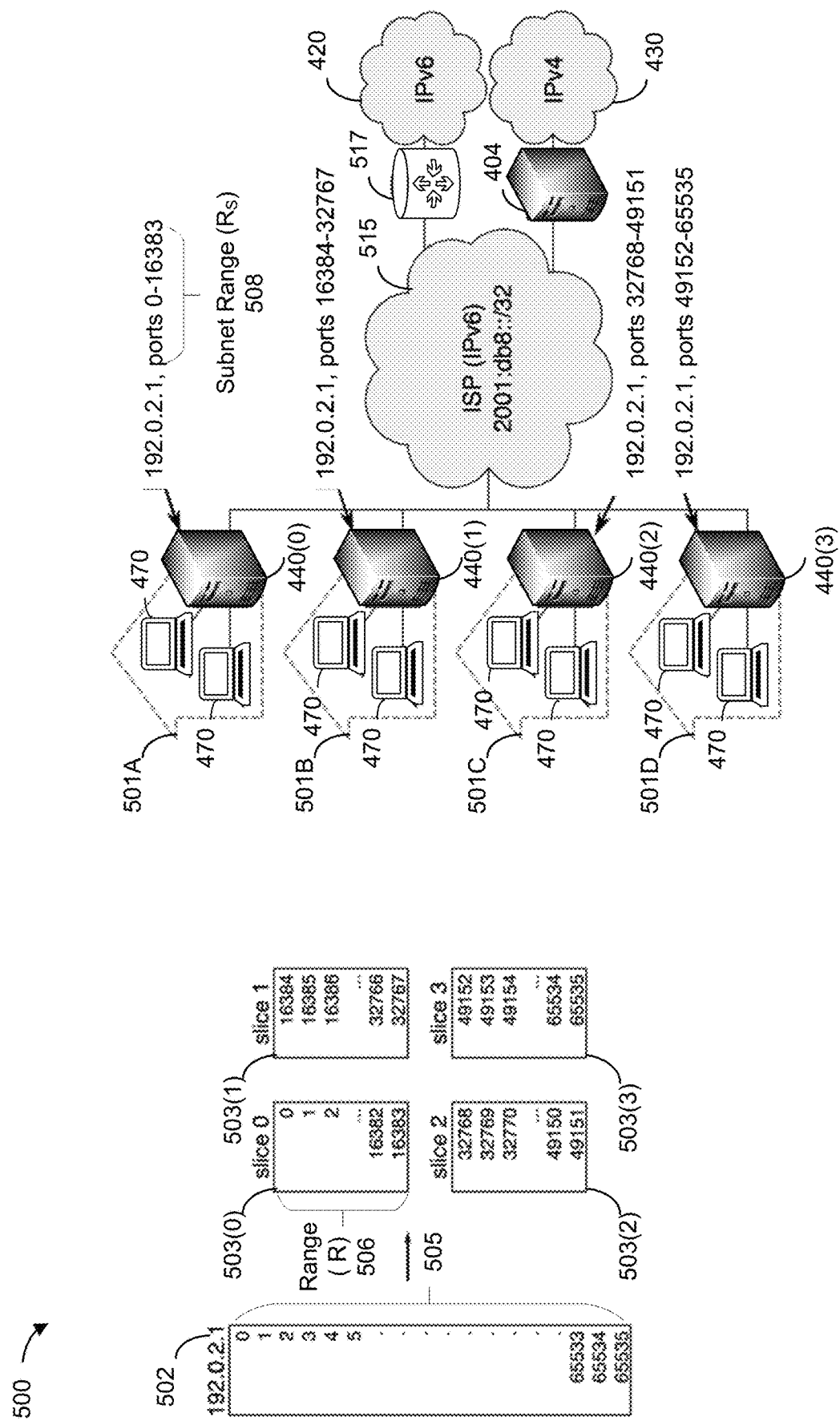
FIG. 5 is a diagram of a MAP-T configuration for four different customers, according to one or more aspects of the present disclosure.

FIG. 5 illustrates a diagram of a MAP-T environment 500 for four different customers 501A, 501B, 501C and 501D (collectively referred to as customer(s) 501). While FIG. 5 illustrates four different customers 501, the present disclosure contemplates any number of different customers 501. FIG. 5 illustrates four MAP-T systems 440(0), 440(1), 440(2), and 440(3) associated with four different customers 501A, 501B, 501C, and 501D, respectively, sharing a single IPv4 address 502 (for example, 192.0.2.1). Each customer 501 can have connected to the corresponding MAP-T system 440 one or more client devices 470 that send and/or receive one or more packets or traffic associated with IPv6 network 340, IPv4 client-side network 330 or both. Each MAP-T system 440 is located at a location of the customer 501, for example, a home, a building, an office, any other location, or a combination thereof. A transport space associated with the single IPv4 address 502 is separated into ranges or slices of ports based on the number of customers 501. For example, the transport space 505 (for example, 0 through 65535) is split into four separate transport ranges or slices 503(0), 503(1), 503(2), and 503(3) (collectively referred to as transport slice(s) 503) that correspond to customers 501(0), 501(1), 501(2), and 501(3), respectively. Each slice 503 comprises a range (R) 506 of ports, for example, slice 0 or slice 503(0) includes ports 0 through 16383. While four transport slices 503 are shown, the present disclosure contemplates any number of transport slices 503 and any number of ports associated with a transport slice 503 based, for example, on the number of client devices 470, the number of MAP-T systems 440 or both.

The EA bits 413 comprises an IPv4 prefix (based on a mapping rule) and a slice identifier (for example, 0, 1, 2, or 3 corresponding to an associated transport slice 503(0), 503(1), 503(2), or 503(3), respectively). Each of the client devices 440, for example, client devices 440(0)-440(3), is assigned the same IPv4 source address (such as 192.0.2.1). Each of the client devices 440 is also assigned a subnet range (RS) 508 of ports, for example, MAP-T system 440(0) is assigned subnet range 0-16383 as indicated by transport slice 503(0), MAP-T system 440(1) is assigned subnet range 16383-32767 as indicated by transport slice 503(1), MAP-T system 440(2) is assigned subnet range 32768-49151 as indicated by transport slice 503(2) and MAP-T system 440(3) is assigned subnet range 49152-65535 as indicated by transport slice 503(3). In this way, a plurality of MAP-T systems can utilize the same IPv4 source address within an IPv6 network.

Each MAP-T system 440 associated with each customer 501 is connected to an IPv6 enabled Internet service provider (ISP) 515. The ISP 515 routes via router 517 IPv6 traffic to an IPv6 network 340. The ISP 515 routes IPv6 traffic that requires mapping back to IPv4 to a border router 404 to transform or map the IPv6 traffic back to IPv4 for routing to IPv4 client-side network 330.

Figure 6:
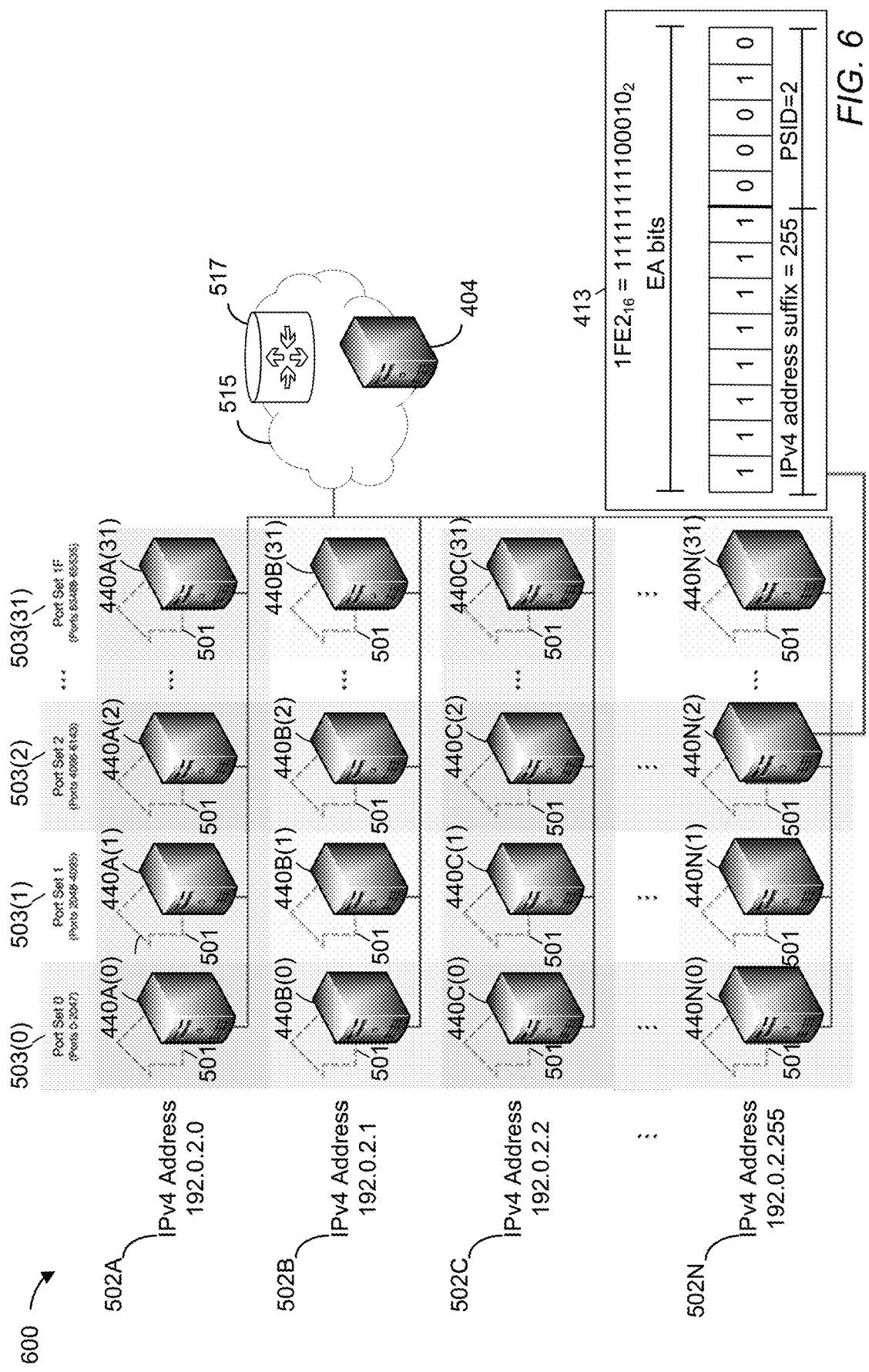
FIG. 6 is a diagram of a MAP-T configuration for a plurality of customers, according to one or more aspects of the present disclosure.

FIG. 6 illustrates a diagram of a MAP-T system 600 for a plurality of customers 501, according to one or more aspects of the present disclosure. Each of the customers 501 is associated with a MAP-T system 440. A plurality of IPv4 addresses 502 can be associated with a plurality of MAP-T systems 440. For example, an IPv4 address 502A (such as 192.0.2.0) can be associated with a MAP-T system 440A(0) to 440A(31) (0-31 representing 32 distinct MAP-T systems 440) with MAP-T systems 440A(0), 440A(1), 440A(2), and 440A(31 (associated with transport slices 503(0) (transport ports 0-2047), 503(1) (transport ports 2047-4095), 503(2) (transport ports 4096-6143), and 503(31) (transport ports 63448-65535), respectively, an IPv4 address 5026 (such as 192.0.2.1) can be associated with a MAP-T systems 4406(0) to 4406(31) with MAP-T systems 4406(0), 4406(1), 4406 (2), and 4406(31) associated with transport slices 503(0), 503(1), 503(2), and 503(31), respectively, an IPv4 address 502C (such as 192.0.2.2) can be associated with a MAP-T system 440C(0) to 440C(31) with MAP-T systems 440C(0), 440C(1), 440C(2), and 440C(31) associated with transport slices 503(0), 503(1), 503(2), and 503(31), respectively, and all the way to an IPv4 address 502M (such as 192.0.2.255) (where N represents 256) can be associated with MAP-T systems 440N(0) to 440N(31) with MAP-T systems 440N (0), 440N(1), 440N(2), and 440N(31) associated with transport slices 503(0), 503(1), 503(2), and 503(31), respectively. For the example of FIG. 6, 256 unique IPv4 addresses (502A through 502N) can be utilized with each unique IPv4 address 502 multiplexed across 32 MAP-T systems 440 (illustrated as 440X(0) to 440X(31), where X represents rows A-N). Each of the MAP-T systems 440 are connected to an ISP 515.

As illustrated in FIG. 6, each of the MAP-T systems 440 are associated with 2048 transport ports (subnet range) of a transport slice 503 which applies to both TCP and UDP. The MAP-T environment 600 enables the 255 IP addresses to be shared across approximately 8,160 customers 501. The EA bits 413 in the IPv6 source address 410 identify a unique IPv6 address per MAP-T system 440. The border router 404 converts any one or more packets received between IPv6 and IPv4 as required.

Figure 7:
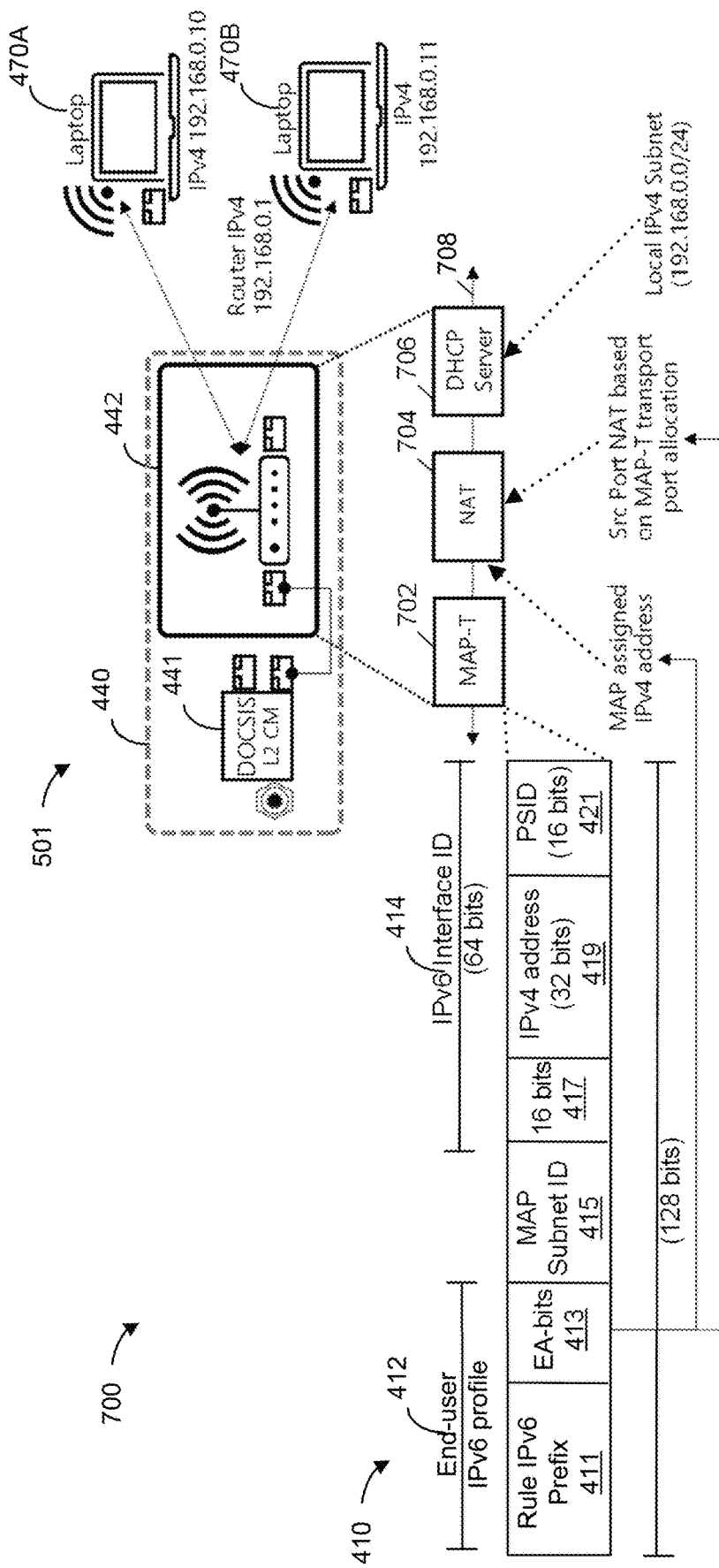
FIG. 7 is a diagram of a MAP-T configuration that includes a MAP-T system connected to a plurality of client devices that are associated with a customer 501, according to one or more aspects of the present disclosure.

FIG. 7 is a diagram of a MAP-T environment 700 that includes MAP-T system 440 connected to a plurality of client devices 470A and 470B (collectively referred to as client device(s) 470) associated with a customer 501, according to one or more aspects of the present disclosure. The client devices 470 are connected to the MAP-T system 440 via a wireless connection, such as via an IPv4 router with an IPv4 address, such as 192.168.0.1. Each client device 470 can be assigned an IPv4 address, for example, client device 470A can have the IP address of 192.168.0.10 and client device 470B can have the IP address of 192168.0.11. While only two client devices 470 are illustrated in FIG. 7, the present disclosure contemplates that any number of client devices 470 can be connected to the MAP-T system 440.

A MAP-T-system 440 can comprise a MAP-T element 702, a NAT element 704, and a DHCP server 706. As illustrated elements 702, 704 and 706 form a bidirectional pipeline for processing packets from the IPv4 Internet-side network to the IPv4 client-side network and vice versa.

The IPv4 client-side network is defined by the DHCP server 706. The MAP-T system 440 receives MAP-T details via DHCP (such as a DHCPv4, a DHCPv6, etc.), for example. For example, the DHCP server 706 provides information such as any of the IPv6 port set ID, the size of the IPv4 prefix to be used, any other information, or a combination thereof. The DHCP server 706 assigns IPv4 source IP addresses to each connecting client device 470, for example, the IPv4 source IP address of 192.168.0.10 to client device 470A and the IPv4 source IP address of 192, 168.0.11 to client device 470B. Client devices 470 communicate with t e access point device 442 associated with IPv4 source IP addresses, for example, IP address 192.158.0.1, which is provided to the client devices 470 by the DHCP server 706. Each client device 470 can now send to the access point device 442 one or more packets or data for communication to the IPv4 Internet-side network 330.

The access point device 442 has a NAT element 704. The NAT element 704 remaps the IPv4 source address associated with the packet from the client device 470 to use the IPv4 source address assigned by the MAP-T element 702 and remaps the one or more source ports coming from the client device 470 into the restricted range that the MAP-T element 702 has communicated. The NAT element 704 transforms or maps the IPv4 source address(es) and the source port*s) associated with a packet from a client device 470 before sending the packet(s) to the MAP-T element 702.

The MAP-T element 702 receives the IPv6 source address based on the assigned IPv4 source address and also creates the destination IPv6 address based on the slash 95 prefix rule, such as by copying the destination IPv4 into the 32-bit IPv6 address. The MAP-T element 702 can send the packet (s) (or traffic) to the IPv4 Internet-side network 330 via the connection to the DOCSIS L2 cable modem 441 that is connected to the CMTS 406. One or more packets can also be received from the IPv4 Internet-side network 330 with the above processing occurring in reverse. For example, a packet is received at the IPv6 MAP-T address. The MAP-T element 702 transforms the source IP and destination IP addresses (on the DS, from the IPv6 address to the IPv4 address) Pv4 packets received from the client device 470 to IPv6 packets and passes the information back through the NAT element 704 which recovers the original ports used. The access point device 442 sends the transformed packet to the client device 470 (for example, the device that requested the information or data).

The DHCPv6 service running on DHCP sever 706 is distinct from the DHCPv4 service running in the IPv4 client-side network 330 and is applicable to the MAP-T or IPv6 network 340. The MAP-T system 440 operates a DHCP server 706 (a local IPv4 subnet, for example 192, 168.0.0/24) that is compatible with IPv4 in a local network. The MAP-T system 440 assigns NATs 704 to a MAP-T 702 assigned IPv4 source address. The MAP-T system 440 translates the IPv4 destination address using the assigned border router IPv6 address and embeds the 32 bit IPv4 address into a 96 bit IPv6 prefix.

Figure 8:
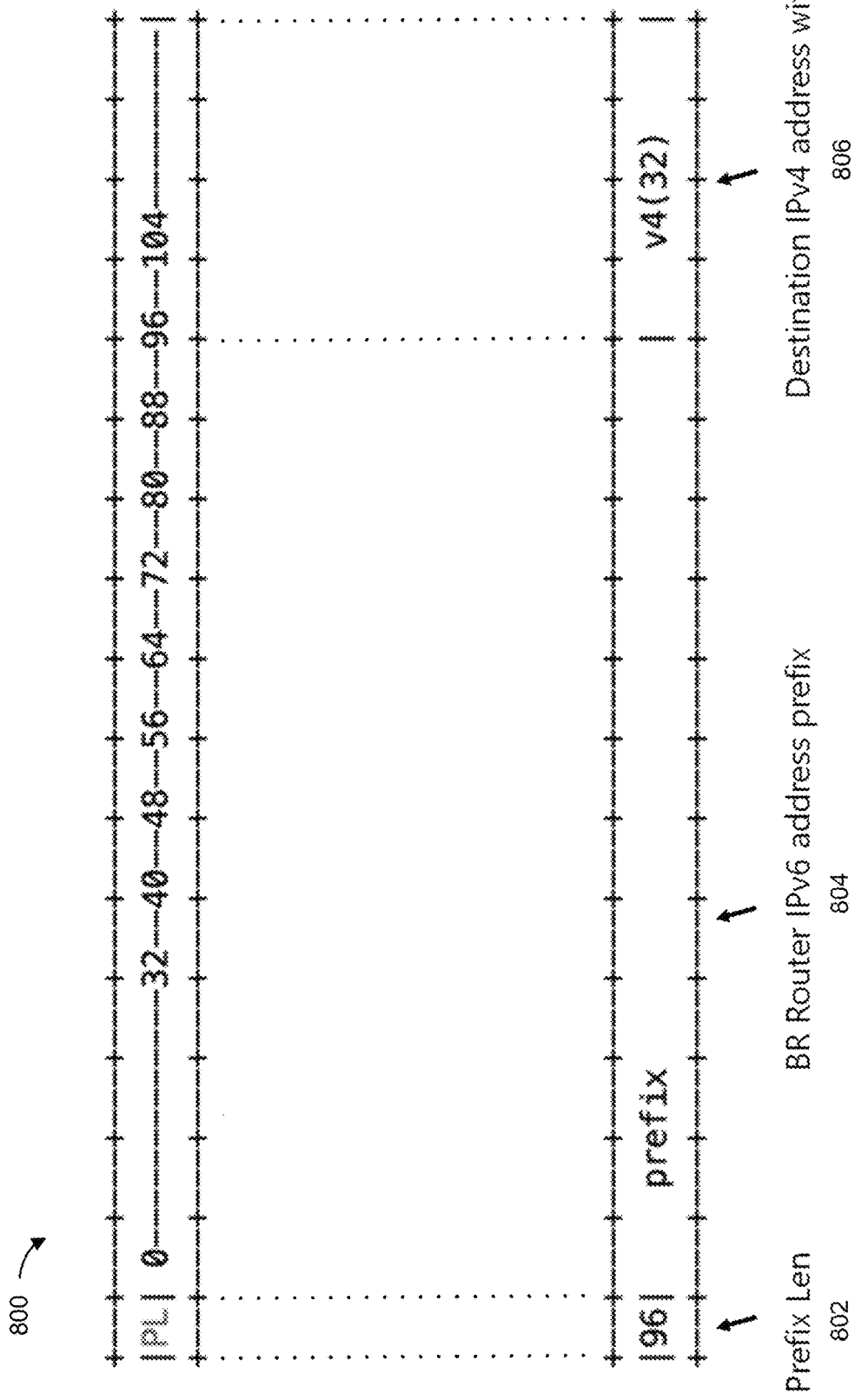
FIG. 8 is an example IPv6 destination address translation from an IPv4 address, according to one or more aspects of the present disclosure.

FIG. 8 is an example IPv6 destination address translation from an IPv4 destination address 806 with MAP-T, according to one or more aspects of the present invention. The source IPv6 address comprises 128-bits at a prefix length (Prefix Len or PL) 802 of 96. The PL 802 at 96 is expressed as an integer between 1 through 128 or 1-bit to 128-bits, Table 800 defines the IPv6 destination address translation from an IPv6 address through the combination of a supplied 96-bit prefix for the MAP-T border router 404 (making up the first 96-bits of the 128-bit IPv6 address) and the 32-bit IPv4 address (making up the last 32-bits of the 128-bit IPv5 address).

The source IPv6 address includes a border router IPv6 address prefix (prefix) 804 (96 bits) followed by a destination IPv4 address with MAP-T 806 (a copy of the IPv4 destination address of 32 bits). The prefix 804 is supplied by a DHCPv6 server 706 or as an option a DHCP server. For DHCPv4, it is similar to a DNS address or a default gateway. Options are encoded into the DHCP traffic to the MAP-T system. Similarly for MAP-T DHCPv6 has a plurality of options for configuring the access point device 442 to work for the border router 404 as well as all of the port set IDs and the prefix as provided in the MAP-T configuration. The border router 404 information is supplied in the DHCPv6 configuration options. The access point device 442 can then create the destination address. The IPv4 destination address associated with the IPv4 client-side network 330 is copied into the last 32-bits of the IPv6 address.

When sending traffic from the IPv4 client-side network 330 to IPv4 Internet-side network 350, the prefix 804 is important as the prefix 804 points to the border router 404 which does the MAP-T processing. Encoding within the IPv6 destination address the destination IPv4 destination address does not cause any issues as the IPv6 address ignores positions from bit 64 to bit 128, for example, the border router 404 knows that bits 64-128 are embedded with the IPv4 destination address 806.

Figure 9:
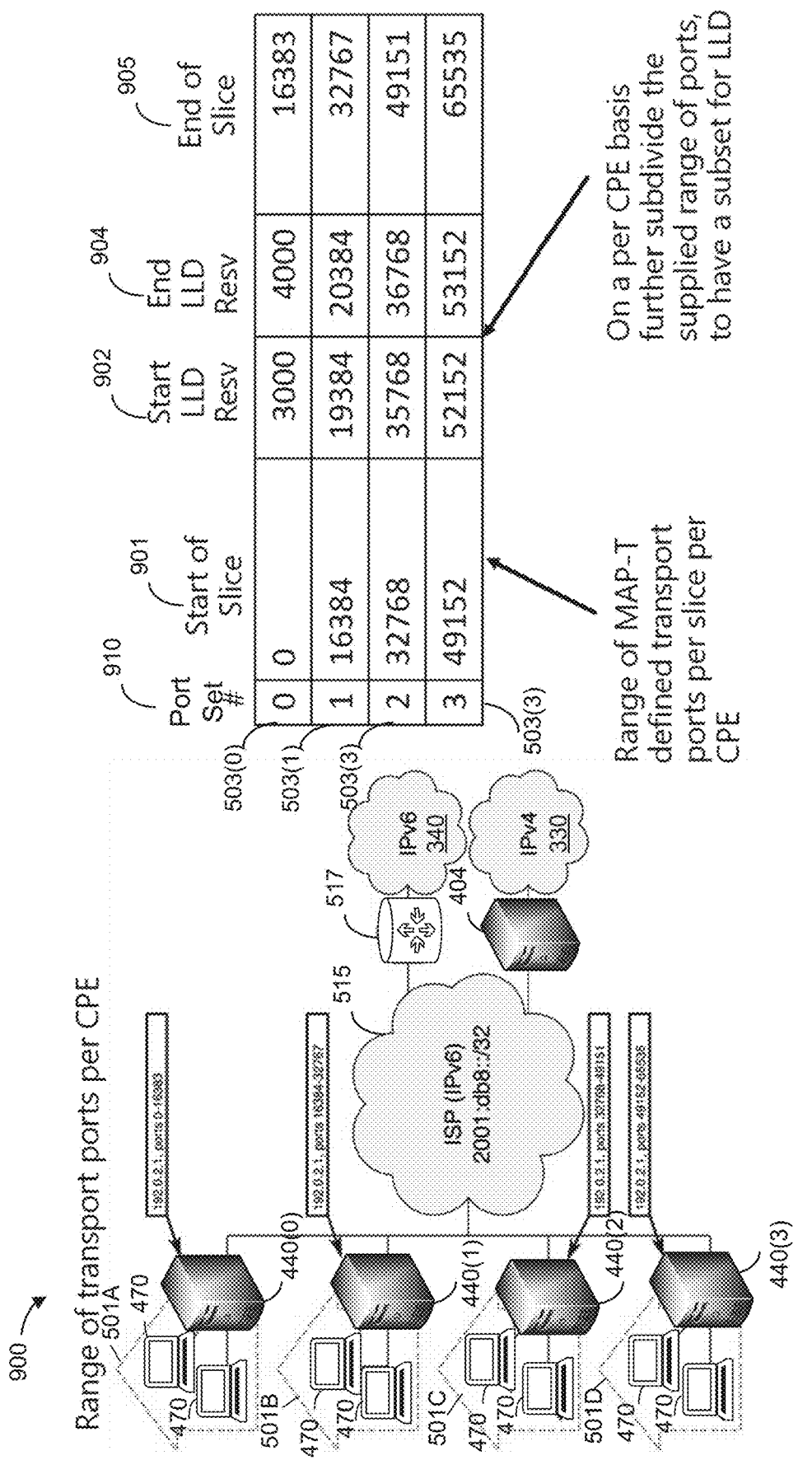
FIG. 9 illustrates a source port remap for low latency DOCSIS (LLD) using NAT, according to one or more aspects of the present disclosure.

FIG. 9 illustrates a source port (SrcPort) remap for LLD using NAT, according to one or more aspects of the present invention. As an example, four MAP-T systems 440 are connected to an ISP 515 with all mapped to the same IPv4 address (such as 192.0.2.1). Each MAP-T system 440 is associated with a specific transport slice 503 (for example, transport slices 503(0), 503(1), 503(2) and 503(2) that correspond to the port set 910) that includes a defined subnet range of ports (for example, transport ports of start of slice 901 through end of slice 905). The DOCSIS CM CFG file 1020, as discussed with reference to FIG. 10B, can include predefined classifier rules for the range of reserved ports for LLD traffic.

The start LLD reservation (Resv) 902 and the end LLD Resv 904 define LLD transport ports from the subnet ranges 503 that are defined for each MAP-T system 440 for use for mapping LLD traffic or packets. For example, MAP-T system 440(0) is mapped to a transport slice 503(0) that has a start transport port identifier of 0 (start of slice) and an end transport port identifier of 16383 (end of slice) with ports 3000 (start LLD reserved (RESV)) to 4000 (end LLD RESV) reserved for LLD traffic, MAP-T system 440(1) is mapped to a transport slice 503(1) that has a start transport port of 16384 and an end transport port of 32767 with ports 19384 to 20384 reserved for LLD traffic, MAP-T system 440(2) is mapped to a transport slice 503(2) that has a start transport pro of 35768 and an end transport port of 49151 with ports 35768 to 36768 reserved for LLD traffic, and MAP-T system 440(3) is mapped to a transport slice 503(3) that has a start transport port of 52152 and an end transport port of 65535 with ports 52152 to 53152 reserved for LLD traffic. The example illustrated in FIG. 9 provides 1000 unique ports for NAT to use for LLD traffic while all other traffic can be mapped into the remaining ranges. LLD traffic identified by the NAT as requiring low latency is remapped to a reserved port. While certain ports are illustrated as reserved for LLD traffic, the present disclosure contemplates that any portion or all of a subnet port range within a range of ports assigned to a MAP-T system 440 can be reserved for LLD traffic.

As an example, the MAP-T (from the DHCPv6 server 470 provides the transport slice 503, such as at row 0, with the start of slice 901 of port 0 to the end of slice 905 of port 16383. For LLD purposes, a subnet range or portion of the transport slice 503 is selected only for use for LLD traffic and is mapped into the DOCSIS classifier that is used.

The MAP-T rules are EA bits. In the PSID bits 421 there are 5 available bits. The PSID bits 421 identify which of the port sets 910 (for example, port set 0, port set 1, port set 2, and port set 3) that are going to be used in a particular access point device 440.

FIG. 10A illustrates an example cable modem configuration for NAT/IPv4, according to one or more embodiments of the present invention. A 1×IP address (a single IP address) per customer associated with a customer premises equipment or a customer equipment is assigned such that the entire range of transport ports (0-65535) is available for use as shown in the configuration file 1010 with transport ports 3000-4000 reserved for US and 3000-4000 reserved for DS classification. All of the cable modem configurations receive the same configuration file 1010.

FIG. 10B illustrates an example MAP-T system 440 for MAP-T NAT LLD, according to one or more aspects of the present disclosure. A single DOCSIS CM configuration (CFG) file 1020 is used to configure each of the DOCSIS L2 cable modems 441. As different MAP-T transport port ranges may be assigned to each of the DOCSIS L2 cable modems 441, the single DOCSIS CM CFG file 1020 must accommodate classifiers for all possible ranges. In the example, each of the four rows of the table (rows 0-3) is translated into one or more US classifiers 1022 associated with a US LLD SF #1 1021 and one or more DS classifiers 1024 associated with a DS LLD SF #2 1023 in the DOCSIS CM CFG file 1020. Each DOCSIS L2 cable modem 441 is assigned service flows (SF #1 for US and SF #2 for DS). The US classifier for transport ports relies on a "start port" and an "end port." To classify traffic to a service flow, a classifier is needed, for example, each of the four rows of the table are mapped into classifiers. For example, if have 32 MAP-T systems 440 sharing a single IPv4 address, 64 classifier rules would be required in the DOCSIS CM CFG file 1020.

Figure 11:
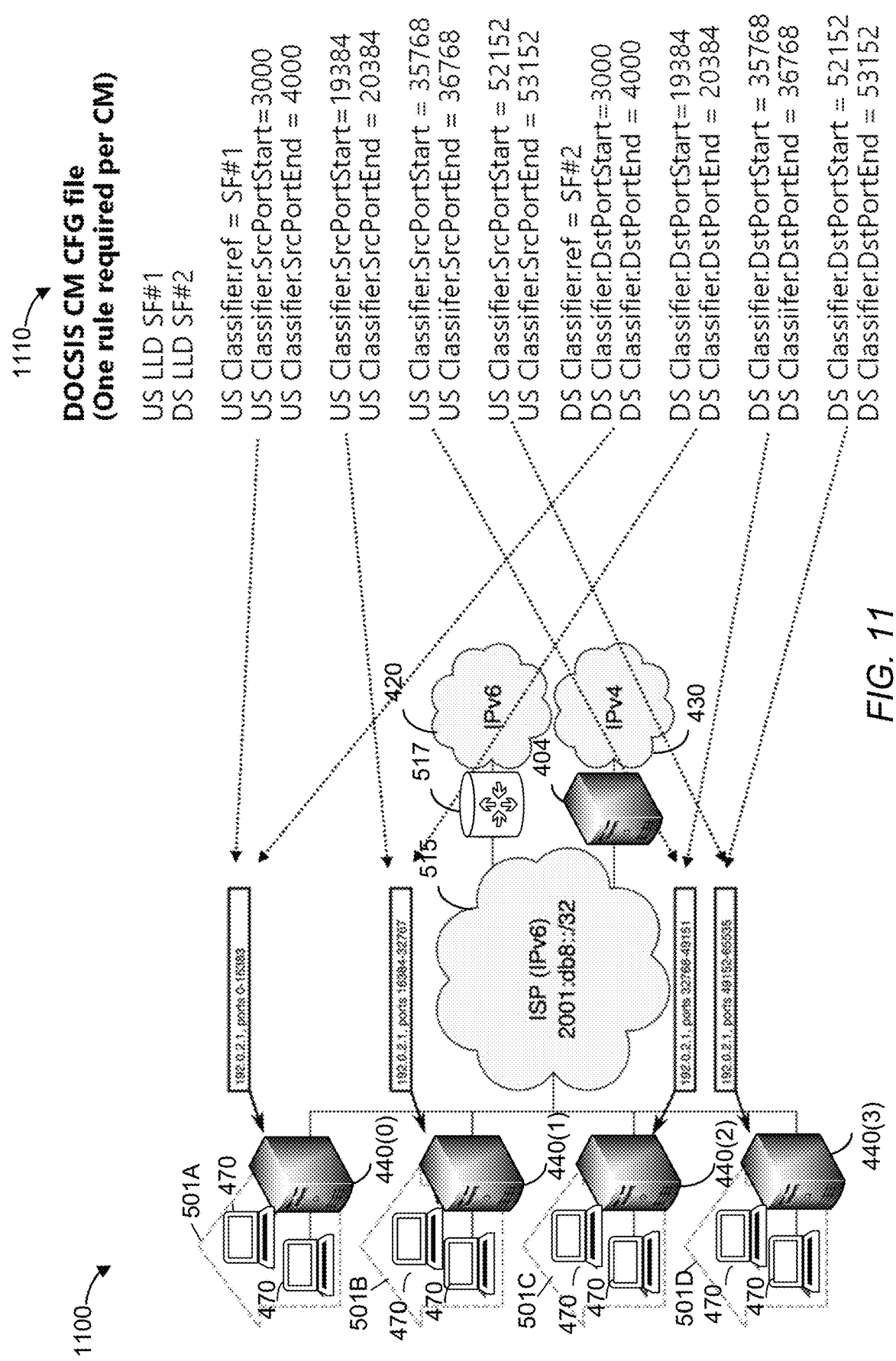
FIG. 11 illustrates a plurality of MAP-T systems associated with a DOCSIS cable modem configuration file, according to one or more aspects of the present disclosure.

FIG. 11 illustrates a plurality of MAP-T systems 440 associated with a DOCSIS cable modem configuration file 1110. In this example, a single configuration file is sent to each of the MAP-T systems 440. One rule is required for each MAP-T system 440. Each of the MAP-T systems 440 receives the same cable modem configuration (CFG) file 1110. The MAP-T constrains each MAP-T system 440 to just one transport slice 503 associated with the such that each cable modem 440 uses ports only associated with the IPv4 address 502 such that the MAP-T system 440 does not use transports ports outside of the associated transport slice 503. As a result, only a single range of classifiers from the DOCSIS cable modem CFG file 1110 will match and be used for LLD traffic. For example, each of the MAP-T systems 440 only use the two classifiers (one associated with US and one associated with DS) associated with the subnet range. MAP-T system 440(1) is associated with US Classifier.SrcPortStart=3000 and US Classifier.SrcPortEnd=4000 with the MAP-T systems 440(1), 440(2) and 440(3) are similarly associated as indicated with specific subnet ranges.

Figure 12:
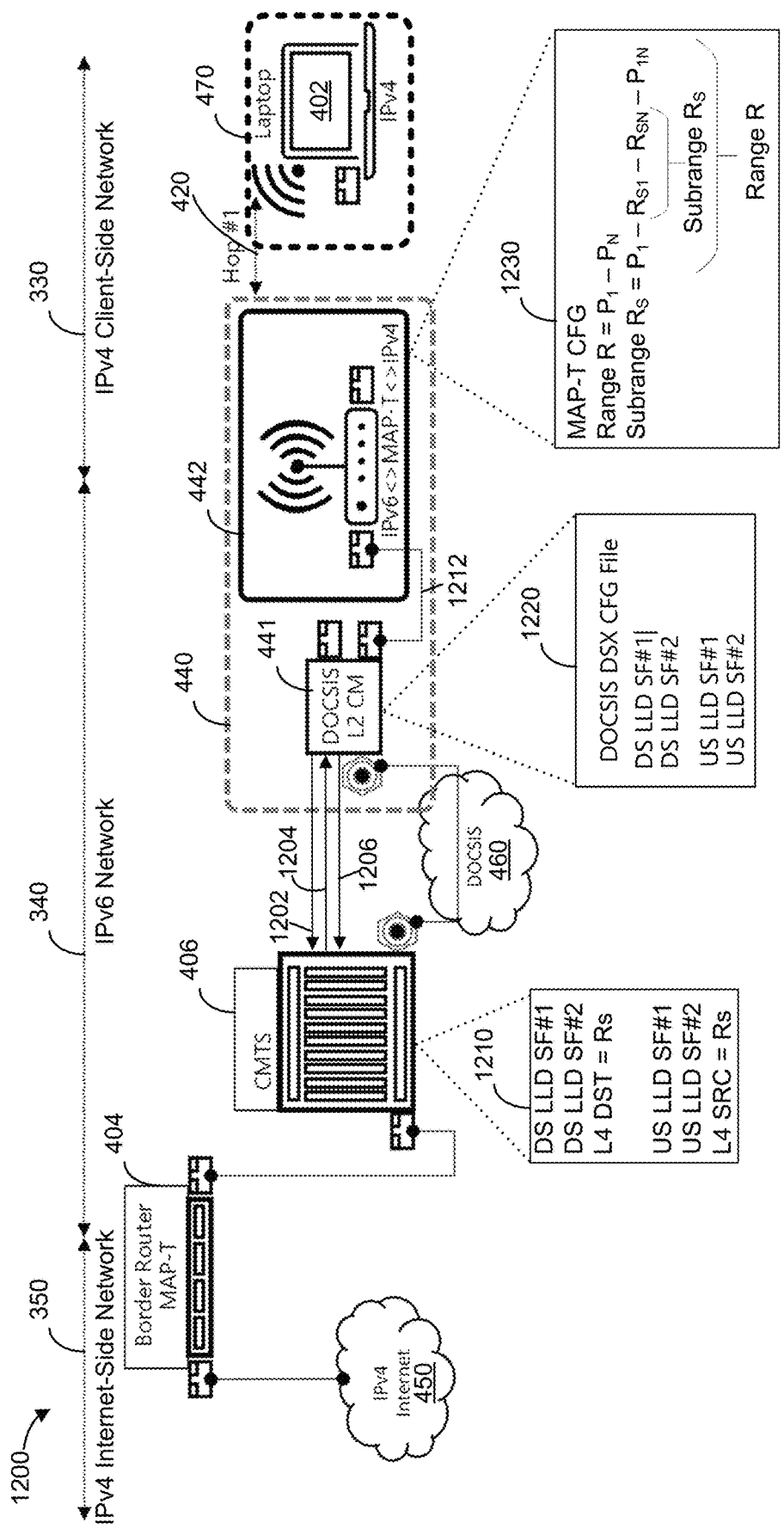
FIG. 12 illustrates a MAP-T system that utilizes a DOCSIS dynamic service transaction (DSX) configuration file, according to one or more aspects of the present disclosure.

FIG. 12 illustrates a MAP-T system 440 that utilizes a DOCSIS DSX configuration file 1220, according to one or more aspects of the present disclosure. A MAP-T system 440 can rely on a MAP-T configuration 1230 instead of a DOCSIS cable modem configuration file 1020 as discussed with reference to FIG. 10B. The information in the DOCSIS cable modem configuration file 1020 remains fixed while the MAP-T system 440 is active. If the MAP-T system 440 reboots, it is quite possible that the exact IPv4 address and port set information previously communicated to the MAPT-T system 440 may change. As long as the new IPv4 address and port set information supplied after the reboot adheres to the existing "scheme" (for example, where the same slice/range approach is retained) then the information identified in the DOCSIS cable modem configuration file 1020 will match.

FIG. 12 illustrates an approach that does not require hardcoding the classifier details within the DOCSIS cable modem configuration file 1020. A DOCSIS DSX facility is used for any MAP-T system 440 discussed herein. The access point device 442 receives the MAP-T configuration information from the CMTS 406, and is configured to identify an appropriate sub-range (Rs) out of the allocated MAP-T transport slice/range R. The access point device 442 communicates with the DOCSIS L2 cable modem 441 via a defined interface 1212 which is an internal interface (when the DOCSIS L2 cable modem 441 and the access point device 442 are a single device) or an external interface (when the DOCSIS L2 cable modem 441 and the access point device 442 are separate devices).

The sub-range Rs is used by the NAT element 704 of the access point device 442 for traffic that is identified as requiring low-latency treatment. In the case of a single-box setup, the access point device 442 can then communicate the sub-range Rs to the embedded DOCSIS L2 cable modem 441 through an defined interface 1212. For a MAP-T system 440 where the DOCSIS L2 cable modem 441 and the access point device 442 are separate devices, the access point device 442 can communicate to the external DOCSIS L2 cable modem 441 through a defined interface 1212. Once the DOCS L2 cable modem 441 receives the required Rs range from the CMTS 406, a once-off DOCSIS DSX transaction is triggered to the connected CMTS 406.

The DSX transaction installs a US classifier, matching the Rs range on Layer-4 source ports, and installs a DS classifier, matching the Rs range on Layer-4 downstream ports. This DSX transaction enables the correct classifiers to be installed so that both US and DS traffic will be mapped to the low-latency service flows as a result of the normal classification processing of the DOCSIS L2 cable modem 441 and the CMTS 406. The benefit of this approach is that if MAP-T is configured to enable large numbers (M) of MAP-T systems 440 per single IPv4 source address which requires that the DOCSIS cable modem CFG file 1020 will require 2×M classifiers as each classifier is associated with an US and an DS for each MAP-T system 440, while the DOCSIS DSX CFG file 1220 does not require low-latency related classifiers completely but rather requires a defined interface 1212 between the DOCSIS L2 cable modem 441 and the access point device 442. Another benefit is that there is no requirement for tight coordination between the MAP-T service configuration and the configuration of the DOCSIS L2 cable modem 441, making for an easier to enable/ provision service. This coordination is based on the configuration of the border router 404, the configuration of the DHCPv6 server 470, and the DOCSIS L2 cable modem 441 configuration file (for example, the DOCSIS DSX configuration file 1220). The border router 404 is manually configured and that manual configuration feeds into the DHCpv6 configuration options that are sent to the MAP-T systems 440 systems connected to the border router 404, such as via a CMTS 406. For example, if there is a split of eight MAP-T systems 440 per IPv4 source address, then the border router 404 must be informed of this split and the configuration of the DHCPv6 server needs to be updated along with the DOCSIS cable modem configuration file. In the case of DSX, the DHCPv6 configuration and border router 303 can be kept integrated together while the DHCPv6 configuration received by the access point device 442 can then be used by the access point device 442 to determine what the sub-net range is and have that signaled to the DSX agent so that there is no need to have the configuration of the access point device 442 tied or dependent on the MAP-T backend.

The DOCSIS DSX CFG file 1220 is used by the DOCSIS L2 cable modem 441 to identify the required sub-range Rs of the overall assigned port range R, and configure this into the DOCSIS L2 cable modem 441 for the subsequent DSX transaction. Once the classifiers are installed (in both the US and DS) there is no further DSX interactions between the DOCSIS L2 cable modem 441 and the CMTS 406. The defined interface 1212 between the access point device 442 and the DOCSIS L2 CM 441 (that is used to provision Rs) can be used by the access point device 442 to query the state of the DOCSIS settings within the DOCSIS L2 cable modem 441 (if so required).

A dynamic service add classifier request 1202 can be sent from the DOCSIS L2 cable modem 441 to the CMTS 406. A dynamic service add classifier response 1204 is sent from the CMTS 406 to the DOCSIS L2 cable modem 441 based on the dynamic service add classifier request 1202. A dynamic service classifier ask is sent from the DOCSIS L2 CM 446 to the CMTS 406 based on the dynamic service add classifier request 1202. The communications 1202, 1204 and 1206 are elements of a 3-way handshake that the DOCSIS L2 CM 441 uses to inform the CMTS 406 to add the US and DS classifiers to the specific service flow. The specific classifiers are dynamically created based on the access point device 442 determining what subnet range of ports to use (from the MAP-T) allocation (the same subnet range of ports are then used for the traffic NAT'ing).

The configuration 1210 is a configuration present on the CMTS 406 (and the DOCSIS L2 cable modem 441) after the DSX has occurred (the communications 1202, 1204, and 1206). The configuration 1210 shows the layer 4 (TCP/UDP) port range that has been added to the DS LLD SF #2 (destination) and US LLD SF #2 (source). The base configuration 1230 is based on the configuration that the DOCSIS cable modem configuration file configures on the DOCSIS L2 cable modem 441 and the CMTS 406 (before the DSX has occurred).

Figure 13:
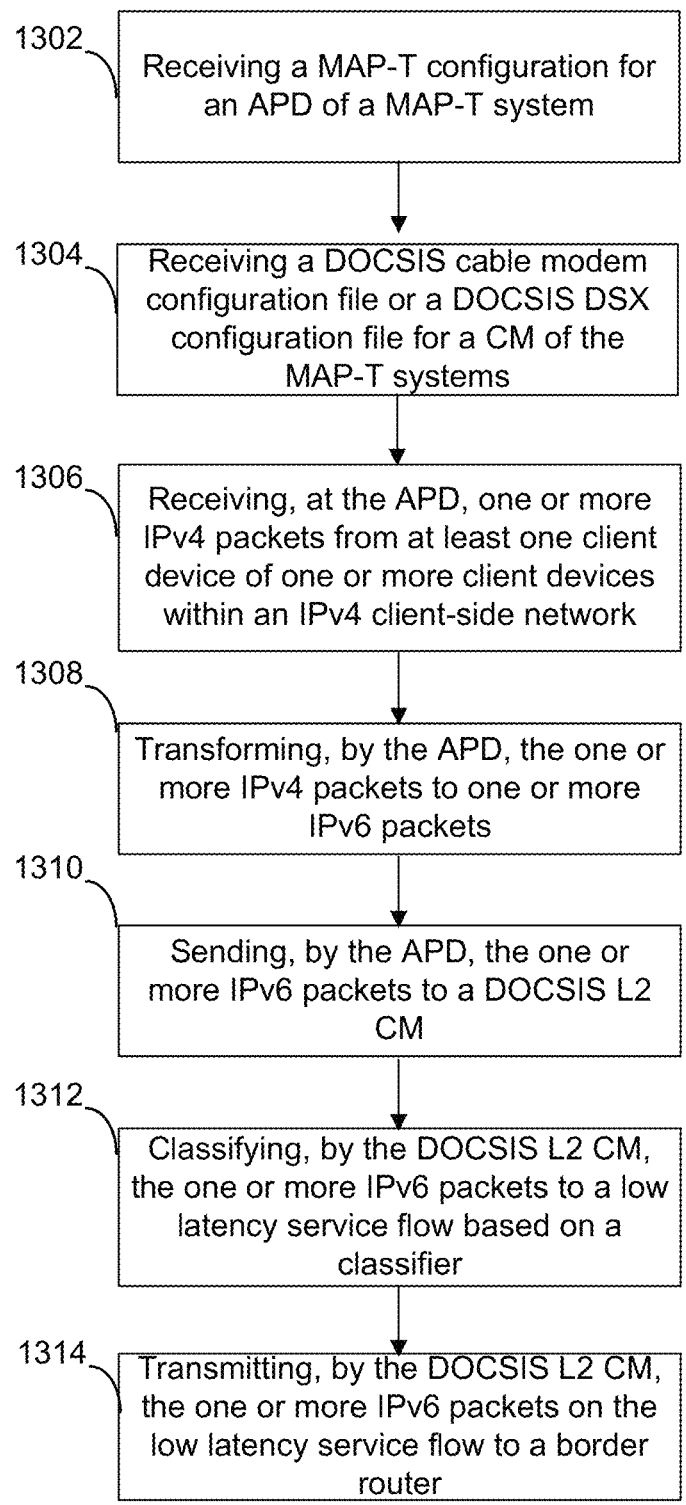
FIG. 13 illustrates a method for transforming by a MAP-T system one or more IPv4 packet for transmission on a low latency service flow, according to one or more aspect of the present disclosure.

FIG. 13 illustrates a method for transforming by a MAP-T system one or more IPv4 packets for transmission on a low latency service flow, according to one or more aspects of the present invention. A MAP-T system, such as MAP-T system 440, may be programmed with one or more computer-readable instructions such as a software or program that when executed by a controller cause performance of one or more steps of a method. In FIG. 13, it is assumed that any one or more elements, systems or components include their respective controllers and their respective software stored in their respective memories, which when executed by their respective controllers perform the functions and operations in accordance with the example embodiments of the present disclosure. While the steps 1302-1314 are presented in a certain order, the present disclosure contemplates that any one or more steps can be performed simultaneously, substantially simultaneously, repeatedly, in any order or not at all (omitted).

At step 1302, an access point device (APD) of a MAP-T system for transforming one or more IPv4 packet for transmission on a low latency service, such as a LLD SF #1 and/or LLD SF #2 discussed herein, receives a MAP-T configuration. The MAP-T configuration can be a DHCPv6 MAP-T configuration such that the MAP-T configuration comprises one or more DHCPv6 configuration options. The one or more DHCPv6 configuration options can comprise a prefix and an active IP address associated with the border router. During configuration of the APD using the MAP-T configuration, the APD is assigned an IPv4 address that is shared by a plurality of MAP-T systems. For example, one or more MAP-T system associated with a boarder router can be assigned to share a single IPv4 address.

At step 1304, a cable modem of the MAP-T system is configured using a DOCSIS cable modem configuration file or a DOCSIS DSX configuration file with each comprising an upstream (US) service flow associated with one or more US classifiers and a downstream (DS) service flow associated with one or more DS classifiers.

At step 1306, the APD receives one or more IPv4 packets from at least one client device of one or more client devices within an IPv4 client-side network with each of the one or more client devices connected to the APD. In one or more embodiments, a service or application associated with the at one client device is identified as requiring low latency such that traffic associated with the service or application is directed by the MAP-T system to a LLD service flow.

At step 1308, the APD transforms the one or more IPv4 packets to one or more IPv6 packets. The transformation is based on a MAP-T configuration used to configure the APD. The one or more IPv4 packets can be transformed by mapping the one or more IPv4 packets to a port within a range of ports of a transport slice assigned to the APD.

At step 1310, the APD sends the one or more IPv6 packets to a cable modem, for example, a DOCSIS L2 cable modem, of the MAP-T system.

At step 1312, the cable modem classifies the one or more IPv6 packets to a low latency service flow based on a classifier.

At step 1314, the cable modem transmits the one or more IPv6 packets on the low latency service flow to a border router for remapping of the one or more IPv6 packets back to the one or more IPv4 packets for sending to an Ipv4 Internet-side network.

Figure 14:
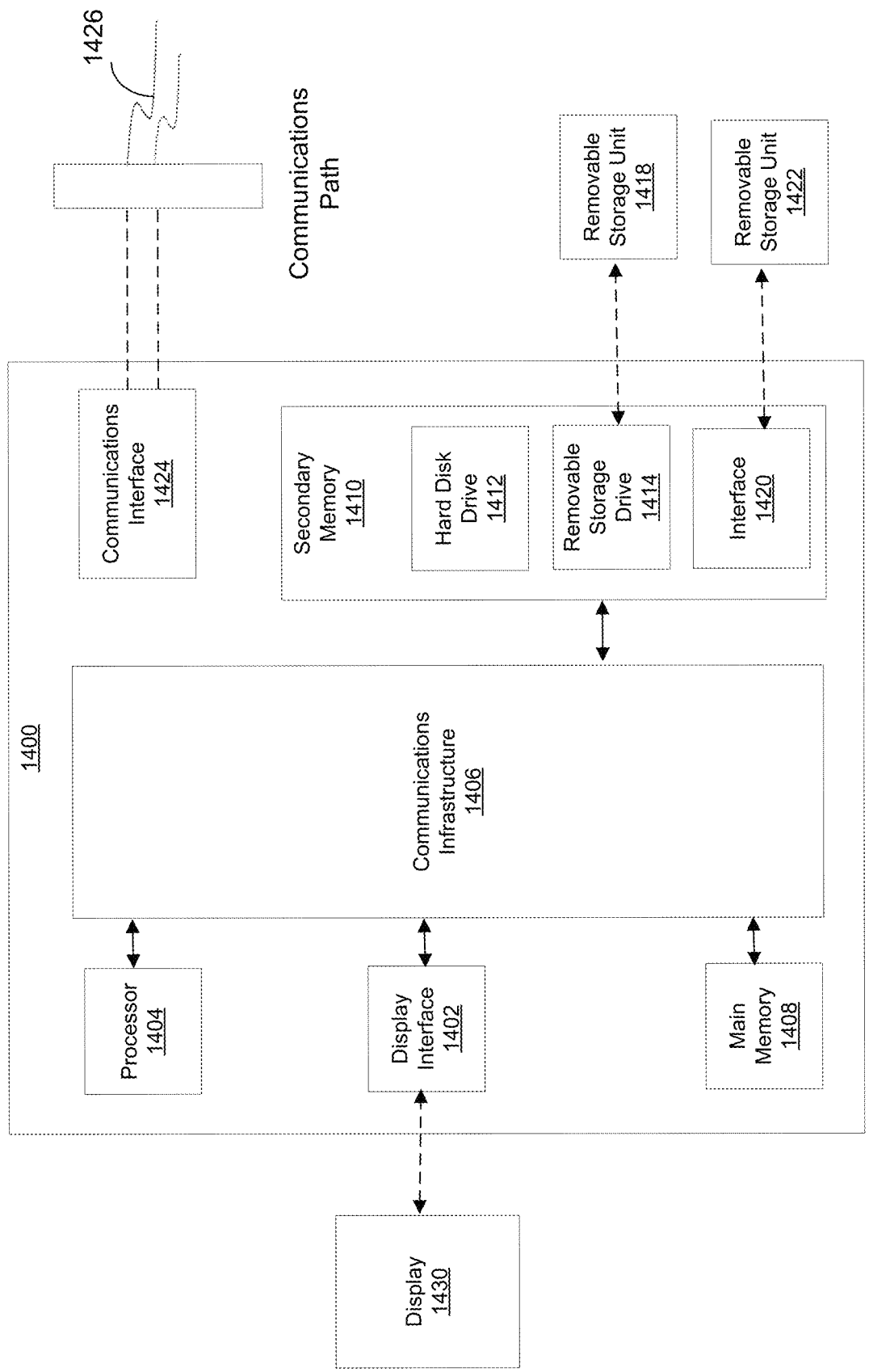
FIG. 14 illustrates a representative computer system in which embodiments of the present disclosure, or portions thereof, may be implemented as one or more computer-readable instructions.

FIG. 14 illustrates a representative computer system 1400 in which embodiments of the present disclosure, or portions thereof, may be implemented as one or more computer-readable instructions, according to one or more aspects of the present disclosure. For example, the MAP-T system 440 including the access point device 442 and/or the cable modem 441 and the CMTS 406 of FIG. 4 may be implemented in whole or in part by a computer system 1400 using hardware, software, firmware, non-transitory computer readable media having instructions stored thereon, or a combination thereof and may be implemented in one or more computer systems or other processing systems. Hardware, software, or any combination thereof may embody modules and components used to implement the methods and steps of the present disclosure.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1418, a removable storage unit 1422, and a hard disk installed in hard disk drive 1412.

Various embodiments of the present disclosure are described in terms of this representative computer system 1400. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1404 may be a special purpose or a general purpose processor device specifically configured to perform the functions discussed herein. The processor device 1404 may be connected to a communications infrastructure 1406, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 1400 may also include a main memory 1408 (e.g., random access memory, read-only memory, etc.), and may also include a secondary memory 1410. The secondary memory 1410 may include the hard disk drive 1412 and a removable storage drive 1414, such as a floppy disk drive, a magnetic tape drive, an optical disk drive, a flash memory, etc.

The removable storage drive 1414 may read from and/or write to the removable storage unit 1418 in a well-known manner. The removable storage unit 1418 may include a removable storage media that may be read by and written to by the removable storage drive 1414. For example, if the removable storage drive 1414 is a floppy disk drive or universal serial bus port, the removable storage unit 1418 may be a floppy disk or portable flash drive, respectively. In one embodiment, the removable storage unit 1418 may be non-transitory computer readable recording media.

In some embodiments, the secondary memory 1410 may include alternative means for allowing computer programs or other instructions to be loaded into the computer system 1400, for example, the removable storage unit 1422 and an interface 1420. Examples of such means may include a program cartridge and cartridge interface (e.g., as found in video game systems), a removable memory chip (e.g., EEPROM, PROM, etc.) and associated socket, and other removable storage units 1422 and interfaces 1420 as will be apparent to persons having skill in the relevant art.

Data stored in the computer system 1400 (e.g., in the main memory 608 and/or the secondary memory 1410) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1400 may also include a communications interface 1424. The communications interface 1424 may be configured to allow software and data to be transferred between the computer system 1400 and external devices. Exemplary communications interfaces 1424 may include a modem, a network interface (e.g., an Ethernet card), a communications port, a PCMCIA slot and card, etc. Software and data transferred via the communications interface 1424 may be in the form of signals, which may be electronic, electromagnetic, optical, or other signals as will be apparent to persons having skill in the relevant art. The signals may travel via a communications path 1426, which may be configured to carry the signals and may be implemented using wire, cable, fiber optics, a phone line, a cellular phone link, a radio frequency link, etc.

The computer system 1400 may further include a display interface 1402. The display interface 1402 may be configured to allow data to be transferred between the computer system 1400 and external display 1430. Exemplary display interfaces 1402 may include high-definition multimedia interface (HDMI), digital visual interface (DVI), video graphics array (VGA), etc. The display 1430 may be any suitable type of display for displaying data transmitted via the display interface 1402 of the computer system 1400, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 1408 and secondary memory 1410, which may be memory semiconductors (e.g., DRAMs, etc.). These computer program products may be means for providing software to the computer system 1400. Computer programs (e.g., computer control logic) may be stored in the main memory 1408 and/or the secondary memory 1410. Computer programs may also be received via the communications interface 1424. Such computer programs, when executed, may enable computer system 1400 to implement the present methods as discussed herein. In particular, the computer programs, when executed, may enable processor device 1404 to implement the methods illustrated by FIGS. 1-13, as discussed herein. Accordingly, such computer programs may represent controllers of the computer system 1400. Where the present disclosure is implemented using software, the software may be stored in a computer program product and loaded into the computer system 1400 using the removable storage drive 1414, interface 1420, and hard disk drive 1412, or communications interface 1424.

The processor device 1204 may comprise one or more modules or engines configured to perform the functions of the computer system 1200. Each of the modules or engines may be implemented using hardware and, in some instances, may also utilize software, such as corresponding to program code and/or programs stored in the main memory 1208 or secondary memory 1210. In such instances, program code may be compiled by the processor device 1204 (e.g., by a compiling module or engine) prior to execution by the hardware of the computer system 1200. For example, the program code may be source code written in a programming language that is translated into a lower level language, such as assembly language or machine code, for execution by the processor device 1204 and/or any additional hardware components of the computer system 1200. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 1200 to perform the functions disclosed herein. It will be apparent to persons having skill in the relevant art that such processes result in the computer system 1200 being a specially configured computer system 1200 uniquely programmed to perform the functions discussed above.

While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for transforming by a mapping of address and port using translation (MAP-T) system one or more Internet Protocol version 4 (IPv4) packets for transmission on a low latency service flow, comprising:
   receiving, at an access point device (APD) of the MAP-T system, the one or more IPv4 packets from at least one client device of one or more client devices, wherein the APD is connected to the one or more client devices, wherein the APD is assigned an IPv4 address that is shared by a plurality of MAP-T systems, wherein a transport space associated with the IPv4 address is separated into a plurality of transport slices, wherein each APD of the plurality of MAP-T systems is assigned a specific transport slice of the plurality of transport slices, wherein each of the plurality of transport slices comprises a defined subnet range of ports, and wherein the defined subnet range of ports comprises one or more reserved ports for low latency data traffic;
   transforming, by the APD, the one or more IPv4 packets to one or more Internet Protocol version 6 (IPv6) packets based on a MAP-T configuration, wherein transforming the one or more IPv4 packets to one or more IPv6 packets comprises mapping the one or more IPv4 packets to a port within the defined subnet range of ports of the specific transport slice assigned to the APD;
   sending, by the APD, the one or more IPv6 packets to a cable modem (CM) of the MAP-T system;
   classifying, by the CM, the one or more IPv6 packets to a low latency service flow associated with the one or more reserved ports of the defined subnet range of ports of the specific transport slice assigned to the APD based on a classifier; and
   transmitting, by the CM, the one or more IPv6 packets on the low latency service flow to a border router for remapping of the one or more IPv6 packets back to the one or more IPv4 packets for sending to an IPv4 Internet-side network.

2. The method of claim 1, further comprising:
   receiving, at the APD, the MAP-T configuration, wherein the MAP-T configuration comprises one or more DHCPv6 configuration options.

3. The method of claim 2, wherein the one or more DHCPv6 configuration options comprises a prefix and an active IP address associated with the border router.

4. The method of claim 1, further comprising:
   configuring the CM using a Data Over Cable Service Interface Specification (DOCSIS) CM configuration file, wherein the DOCSIS CM configuration file comprises one or more classifiers, wherein the classifier is one of the one or more classifiers.

5. The method of claim 1, further comprising:
creating, by the APD, a destination address for the one or more IPv6 packets, wherein the destination address is copied into a last 32-bits of an IPv6 address of the one or more IPv6 packets.

6. The method of claim 1, wherein the classifier comprises a start transport port identifier and an end transport port identifier that define the range of ports related to low latency traffic.

7. The method of claim 1, further comprising:
configuring the CM using a Data Over Cable Service Interface Specification (DOCSIS) dynamic service (DSX) transaction, wherein the DOCSIS DSX transaction comprises one or more classifiers, wherein the classifier is one of the one or more classifiers.

8. A mapping of address and port using translation (MAP-T) system for transforming one or more Internet Protocol version 4 (IPv4) packets for transmission on a low latency service flow comprising:
a memory storing one or more computer-readable instructions; and
a processor connected to the memory, the processor configured to execute the one or more computer-readable instructions to:
receive, at an access point device (APD) of the MAP-T system, the one or more IPv4 packets from at least one client device of one or more client devices, wherein the APD is connected to the one or more client devices, wherein the APD is assigned an IPv4 address that is shared by a plurality of MAP-T systems, wherein a transport space associated with the IPv4 address is separated into a plurality of transport slices, wherein each APD of the plurality of MAP-T systems is assigned a specific transport slice of the plurality of transport slices, wherein each of the plurality of transport slices comprises a defined subnet range of ports, and wherein the defined subnet range of ports comprises one or more reserved ports for low latency data traffic;
transform, by the APD, the one or more IPv4 packets to one or more Internet Protocol version 6 (IPv6) packets based on a MAP-T configuration, wherein transforming the one or more IPv4 packets to one or more IPv6 packets comprises mapping the one or more IPv4 packets to a port within the defined subnet range of ports of the specific transport slice assigned to the APD;
send, by the APD, the one or more IPv6 packets to a cable modem (CM) of the MAP-T system;
classify, by the CM, the one or more IPv6 packets to a low latency service flow associated with the one or more reserved ports of the defined subnet range of ports of the specific transport slice assigned to the APD based on a classifier; and
transmitting, by the CM, the one or more IPv6 packets on the low latency service flow to a border router for remapping of the one or more IPv6 packets back to the one or more IPv4 packets for sending to an IPv4 Internet-side network.

9. The MAP-T system of claim 8, wherein the processor is further configured to execute the one or more instructions to:
receive at the APD, the MAP-T configuration, wherein the MAP-T configuration comprises one or more DHCPv6 configuration options.

10. The MAP-T system of claim 9, wherein the one or more DHCPv6 configuration options comprises a prefix and an active IP address associated with the border router.

11. The MAP-T system of claim 8, wherein the processor is further configured to execute the one or more instructions to:
configuring the CM using a Data Over Cable Service Interface Specification (DOCSIS) CM configuration file, wherein the DOCSIS CM configuration file comprises one or more classifiers, wherein the classifier is one of the one or more classifiers.

12. The MAP-T system of claim 8, wherein the processor is further configured to execute the one or more instructions to:
create, by the APD, a destination address for the one or more IPv6 packets, wherein the destination address is copied into a last 32-bits of an IPv6 address of the one or more IPv6 packets.

13. The MAP-T system of claim 8, wherein the classifier comprises a start transport port identifier and an end transport port identifier that define the range of ports related to low latency traffic.

14. The MAP-T system of claim 8, wherein the processor is further configured to execute the one or more instructions to:
configuring the CM using a Data Over Cable Service Interface Specification (DOCSIS) dynamic service (DSX) transaction, wherein the DOCSIS DSX transaction comprises one or more classifiers, wherein the classifier is one of the one or more classifiers.

15. A non-transitory computer-readable medium of a MAP-T system storing one or more instructions for transforming one or more Internet Protocol version 4 (IPv4) packets for transmission on a low latency service flow, which when executed by a processor of the MAP-T system, cause the MAP-T system to perform one or more operations comprising:
receiving, at an access point device (APD) of the MAP-T system, the one or more IPv4 packets from at least one client device of one or more client devices, wherein the APD is connected to the one or more client devices, wherein the APD is assigned an IPv4 address that is shared by a plurality of MAP-T systems, wherein a transport space associated with the IPv4 address is separated into a plurality of transport slices, wherein each APD of the plurality of MAP-T systems is assigned a specific transport slice of the plurality of transport slices, wherein each of the plurality of transport slices comprises a defined subnet range of ports, and wherein the defined subnet range of ports comprises one or more reserved ports for low latency data traffic;
transforming, by the APD, the one or more IPv4 packets to one or more Internet Protocol version 6 (IPv6) packets based on a MAP-T configuration, wherein transforming the one or more IPv4 packets to one or more IPv6 packets comprises mapping the one or more IPv4 packets to a port within the defined subnet range of ports of the specific transport slice assigned to the APD;
sending, by the APD, the one or more IPv6 packets to a cable modem (CM) of the MAP-T system;
classifying, by the CM, the one or more IPv6 packets to a low latency service flow associated with the one or more reserved ports of the defined subnet range of ports of the specific transport slice assigned to the APD based on a classifier; and
transmitting, by the CM, the one or more IPv6 packets on the low latency service flow to a border router for remapping of the one or more IPv6 packets back to the one or more IPv4 packets for sending to an IPv4 Internet-side network.

16. The computer-readable medium of claim 15, wherein the one or more computer-readable instructions when executed by the processor further cause the MAP-T system to perform one or more operations comprising:
receiving, at the APD, the MAP-T configuration, wherein the MAP-T configuration comprises one or more DHCPv6 configuration options.

17. The computer-readable medium of claim 16, wherein the one or more DHCPv6 configuration options comprises a prefix and an active IP address associated with the border router.

18. The computer-readable medium of claim 15, wherein the one or more computer-readable instructions when executed by the processor further cause the MAP-T system to perform one or more operations comprising:
configuring the CM using a Data Over Cable Service Interface Specification (DOCSIS) CM configuration file or configuring the CM using a Data Over Cable Service Interface Specification (DOCSIS) dynamic service (DSX) transaction; and wherein the DOCSIS CM configuration file and the DOCSIS DSX transaction comprise one or more classifiers, wherein the classifier is one of the one or more classifiers.

19. The computer-readable medium of claim 15, wherein the one or more computer-readable instructions when executed by the processor further cause the MAP-T system to perform one or more operations comprising:
creating, by the APD, a destination address for the one or more IPv6 packets, wherein the destination address is copied into a last 32-bits of an IPv6 address of the one or more IPv6 packets.

20. The computer-readable medium of claim 15, wherein the classifier comprises a start transport port identifier and an end transport port identifier that define the range of ports related to low latency traffic.

\* \* \* \* \*